United States Patent
Wang et al.

(10) Patent No.: US 9,916,628 B1
(45) Date of Patent: Mar. 13, 2018

(54) INTERVIEW QUESTION MODIFICATION DURING PREPARATION OF ELECTRONIC TAX RETURN

(71) Applicant: Intuit Inc., Mountain View, CA (US)

(72) Inventors: Gang Wang, San Diego, CA (US); Kevin M. McCluskey, Carlsbad, CA (US); Jay J. Yu, Encinitas, CA (US); Matthew L. Sivertson, San Diego, CA (US)

(73) Assignee: INTUIT INC., Mountain View, CA (US)

( * ) Notice: Subject to any disclaimer, the term of this patent is extended or adjusted under 35 U.S.C. 154(b) by 594 days.

(21) Appl. No.: 14/448,481

(22) Filed: Jul. 31, 2014

(51) Int. Cl.
  *G06F 17/22* (2006.01)
  *G07F 19/00* (2006.01)
  *G06Q 40/00* (2012.01)

(52) U.S. Cl.
  CPC ................ *G06Q 40/123* (2013.12)

(58) Field of Classification Search
  USPC .......................................... 705/31
  See application file for complete search history.

(56) References Cited

U.S. PATENT DOCUMENTS

| | | | |
|---|---|---|---|
| 4,213,251 A | 7/1980 | Foundos | |
| 4,809,219 A | 2/1989 | Ashford et al. | |
| 5,006,998 A | 4/1991 | Yasunobu | |
| 5,495,607 A | 2/1996 | Pisello et al. | |
| 5,557,761 A | 9/1996 | Chan et al. | |
| 5,673,369 A | 9/1997 | Kim | |
| 5,819,249 A | 10/1998 | Dohanich | |
| 6,078,898 A | 6/2000 | Davis | |
| 6,535,883 B1 | 3/2003 | Lee et al. | |

(Continued)

FOREIGN PATENT DOCUMENTS

| JP | 2002-117121 A | 4/2002 |
|---|---|---|
| JP | 2005-190425 A | 7/2005 |

(Continued)

OTHER PUBLICATIONS

Notice of Allowance and Fee(s) Due dated May 5, 2017 in U.S. Appl. No. 14/206,682, (30pages).

(Continued)

*Primary Examiner* — Jason Borlinghaus
(74) *Attorney, Agent, or Firm* — Vista IP Law Group LLP

(57) ABSTRACT

Computer-implemented methods, systems and articles of manufacture for modifying the manner in which interview questions are presented to a user of a tax return preparation application to provide a more personalized experience during preparation of an electronic tax return. A selected question that is consistent with a data model or schema is modified or twisted such that the selected question is reworded or rephrased. The modified question, rather than the original question, is presented to the user. The user's answer to the modified question is converted, mapped or "untwisted" to derive a corresponding answer to the original question that is consistent with the data model or schema utilized by the tax return preparation application. The corresponding answer may then be read by a rule engine or logic agent that utilizes a decision table that defines rules to determine which additional or other questions can be presented to the user.

33 Claims, 21 Drawing Sheets

(56) References Cited

U.S. PATENT DOCUMENTS

| | | |
|---|---|---|
| 6,601,055 B1 | 7/2003 | Roberts |
| 6,631,361 B1 | 10/2003 | O'Flaherty et al. |
| 6,690,854 B2 | 2/2004 | Helbing |
| 6,697,787 B1 | 2/2004 | Miller |
| 6,898,573 B1 | 5/2005 | Piehl |
| 6,912,508 B1 | 6/2005 | McCalden |
| 7,234,103 B1 | 6/2007 | Regan |
| 7,295,998 B2 | 11/2007 | Kulkarni |
| 7,331,045 B2 | 2/2008 | Martin et al. |
| 7,448,022 B1 | 11/2008 | Ram et al. |
| 7,539,635 B1 | 5/2009 | Peak |
| 7,565,312 B1 | 7/2009 | Shaw |
| 7,603,301 B1 | 10/2009 | Regan |
| 7,668,763 B1 | 2/2010 | Albrecht |
| 7,680,756 B2 | 3/2010 | Quinn |
| 7,685,082 B1 | 3/2010 | Coletta |
| 7,693,760 B1 | 4/2010 | Fiteni |
| 7,693,769 B1 | 4/2010 | Burlison |
| 7,742,958 B1 | 6/2010 | Leek |
| 7,747,484 B2 | 6/2010 | Stanley |
| 7,761,333 B2 | 7/2010 | Kapp |
| 7,778,895 B1 | 8/2010 | Baxter |
| 7,818,222 B2 | 10/2010 | Allanson |
| 7,849,405 B1 | 12/2010 | Coletta |
| 7,860,763 B1 | 12/2010 | Quinn et al. |
| 7,865,829 B1 | 1/2011 | Goldfield |
| 7,895,102 B1 | 2/2011 | Wilks et al. |
| 7,899,757 B1 | 3/2011 | Talan |
| 7,900,298 B1 | 3/2011 | Char et al. |
| 7,908,190 B2 | 3/2011 | Enenkiel |
| 7,912,768 B2 | 3/2011 | Abeles |
| 7,925,553 B2 | 4/2011 | Banks |
| 8,001,006 B1 | 8/2011 | Yu et al. |
| 8,019,664 B1 | 9/2011 | Tifford et al. |
| 8,082,144 B1 | 12/2011 | Brown et al. |
| 8,108,258 B1 | 1/2012 | Slattery |
| 8,126,820 B1 | 2/2012 | Talan |
| 8,190,499 B1 | 5/2012 | McVickar |
| 8,204,805 B2 | 6/2012 | Eftekhari |
| 8,224,726 B2 | 7/2012 | Murray |
| 8,234,562 B1 | 7/2012 | Evans |
| 8,244,607 B1 | 8/2012 | Quinn |
| 8,346,635 B1 | 1/2013 | Olim |
| 8,346,680 B2 | 1/2013 | Castleman |
| 8,370,795 B1 | 2/2013 | Sage |
| 8,386,344 B2 | 2/2013 | Christina |
| 8,407,113 B1 | 3/2013 | Eftekhari |
| 8,417,596 B1 | 4/2013 | Dunbar et al. |
| 8,417,597 B1 | 4/2013 | McVickar |
| 8,447,667 B1 | 5/2013 | Dinamani et al. |
| 8,452,676 B1 | 5/2013 | Talan |
| 8,473,880 B1 | 6/2013 | Bennett et al. |
| 8,478,671 B1 | 7/2013 | Tifford |
| 8,510,187 B1 | 8/2013 | Dinamani |
| 8,527,375 B1 | 9/2013 | Olim |
| 8,560,409 B2 | 10/2013 | Abeles |
| 8,583,516 B1 | 11/2013 | Pitt |
| 8,589,262 B1 | 11/2013 | Gang |
| 8,607,353 B2 | 12/2013 | Rippert et al. |
| 8,635,127 B1 | 1/2014 | Shaw |
| 8,639,616 B1 | 1/2014 | Rolenaitis |
| 8,682,756 B1 | 3/2014 | Tifford et al. |
| 8,682,829 B2 | 3/2014 | Barthel |
| 8,694,395 B2 | 4/2014 | Houseworth |
| 8,706,580 B2 | 4/2014 | Houseworth |
| 8,788,412 B1 | 7/2014 | Hamm |
| 8,812,380 B2 | 8/2014 | Murray |
| 8,813,178 B1 | 8/2014 | Khanna |
| 8,838,492 B1 | 9/2014 | Baker |
| 9,372,687 B1 | 6/2016 | Pai |
| 9,760,953 B1 | 9/2017 | Wang et al. |
| 2002/0065831 A1 | 5/2002 | DePaolo |
| 2002/0107698 A1 | 8/2002 | Brown et al. |
| 2002/0111888 A1 | 8/2002 | Stanley et al. |
| 2002/0174017 A1 | 11/2002 | Singh |
| 2002/0198832 A1 | 12/2002 | Agee |
| 2003/0101070 A1 | 5/2003 | Mahosky et al. |
| 2003/0126054 A1 | 7/2003 | Purcell |
| 2003/0139827 A1 | 7/2003 | Phelps |
| 2003/0182102 A1 | 9/2003 | Corston-Oliver et al. |
| 2004/0002906 A1 | 1/2004 | Von Drehnen et al. |
| 2004/0019540 A1 | 1/2004 | William |
| 2004/0019541 A1 | 1/2004 | William |
| 2004/0078271 A1 | 4/2004 | Morano |
| 2004/0083164 A1 | 4/2004 | Schwartz et al. |
| 2004/0088233 A1 | 5/2004 | Brady |
| 2004/0117395 A1 | 6/2004 | Gong |
| 2004/0172347 A1 | 9/2004 | Barthel |
| 2004/0205008 A1 | 10/2004 | Haynie et al. |
| 2005/0171822 A1 | 8/2005 | Cagan |
| 2005/0216379 A1 | 9/2005 | Ozaki |
| 2006/0112114 A1 | 5/2006 | Yu |
| 2006/0155632 A1 | 7/2006 | Cherkas et al. |
| 2006/0178961 A1 | 8/2006 | Stanley et al. |
| 2006/0282354 A1 | 12/2006 | Varghese |
| 2006/0293990 A1 | 12/2006 | Schaub |
| 2007/0033116 A1* | 2/2007 | Murray ............... G06F 17/243 705/31 |
| 2007/0033117 A1 | 2/2007 | Murray |
| 2007/0033130 A1 | 2/2007 | Murray |
| 2007/0094207 A1 | 4/2007 | Yu |
| 2007/0136157 A1 | 6/2007 | Neher et al. |
| 2007/0150387 A1 | 6/2007 | Seubert et al. |
| 2007/0156564 A1 | 7/2007 | Humphrey et al. |
| 2007/0179841 A1 | 8/2007 | Agassi |
| 2007/0250418 A1 | 10/2007 | Banks et al. |
| 2008/0059900 A1 | 3/2008 | Murray |
| 2008/0097878 A1 | 4/2008 | Abeles |
| 2008/0147494 A1 | 6/2008 | Larson |
| 2008/0162310 A1 | 7/2008 | Quinn |
| 2008/0177631 A1 | 7/2008 | William |
| 2008/0215392 A1 | 9/2008 | Rajan |
| 2008/0243531 A1 | 10/2008 | Hyder et al. |
| 2009/0024694 A1 | 1/2009 | Fong |
| 2009/0037305 A1 | 2/2009 | Sander |
| 2009/0048957 A1 | 2/2009 | Celano |
| 2009/0117529 A1* | 5/2009 | Goldstein ............ G06Q 30/02 434/350 |
| 2009/0125618 A1 | 5/2009 | Huff |
| 2009/0138389 A1 | 5/2009 | Barthel |
| 2009/0150169 A1 | 6/2009 | Kirkwood |
| 2009/0157572 A1 | 6/2009 | Chidlovskii |
| 2009/0193389 A1 | 7/2009 | Miller |
| 2009/0204881 A1 | 8/2009 | Murthy |
| 2009/0239650 A1 | 9/2009 | Alderucci et al. |
| 2009/0248594 A1 | 10/2009 | Castleman |
| 2009/0248603 A1 | 10/2009 | Kiersky |
| 2010/0036760 A1 | 2/2010 | Abeles |
| 2010/0131394 A1 | 5/2010 | Rutsch |
| 2010/0153138 A1 | 6/2010 | Evans |
| 2011/0004537 A1 | 1/2011 | Allanson et al. |
| 2011/0078062 A1 | 3/2011 | Kleyman |
| 2011/0145112 A1 | 6/2011 | Abeles |
| 2011/0225220 A1 | 9/2011 | Huang et al. |
| 2011/0258610 A1 | 10/2011 | Aaraj et al. |
| 2011/0264569 A1 | 10/2011 | Houseworth |
| 2012/0016817 A1 | 1/2012 | Smith et al. |
| 2012/0027246 A1 | 2/2012 | Tifford |
| 2012/0030076 A1 | 2/2012 | Checco et al. |
| 2012/0030577 A1 | 2/2012 | Akolkar et al. |
| 2012/0072321 A1 | 3/2012 | Christian et al. |
| 2012/0109792 A1 | 5/2012 | Eftekhari |
| 2012/0109793 A1 | 5/2012 | Abeles |
| 2012/0136764 A1 | 5/2012 | Miller |
| 2012/0278365 A1 | 11/2012 | Labat et al. |
| 2013/0036347 A1 | 2/2013 | Eftekhari |
| 2013/0080302 A1 | 3/2013 | Allanson |
| 2013/0097262 A1 | 4/2013 | Dandison |
| 2013/0111032 A1 | 5/2013 | Alapati et al. |
| 2013/0138586 A1 | 5/2013 | Jung et al. |
| 2013/0185347 A1 | 7/2013 | Romano |
| 2013/0198047 A1 | 8/2013 | Houseworth |
| 2013/0218735 A1 | 8/2013 | Murray |
| 2013/0262279 A1 | 10/2013 | Finley et al. |

(56) References Cited

U.S. PATENT DOCUMENTS

| | | |
|---|---|---|
| 2013/0282539 A1 | 10/2013 | Murray |
| 2013/0290169 A1 | 10/2013 | Bathula |
| 2014/0108213 A1 | 4/2014 | Houseworth |
| 2014/0172656 A1 | 6/2014 | Shaw |
| 2014/0201045 A1 | 7/2014 | Pai et al. |
| 2014/0207633 A1 | 7/2014 | Aldrich et al. |
| 2014/0241631 A1 | 8/2014 | Huang |
| 2014/0244455 A1 | 8/2014 | Huang |
| 2014/0244457 A1 | 8/2014 | Howell et al. |
| 2014/0337189 A1 | 11/2014 | Barsade et al. |
| 2015/0142703 A1 | 5/2015 | Rajesh |
| 2015/0237205 A1 | 8/2015 | Waller et al. |
| 2015/0254623 A1 | 9/2015 | Velez et al. |
| 2015/0269491 A1 | 9/2015 | Tripathi et al. |
| 2016/0027127 A1 | 1/2016 | Chavarria et al. |
| 2016/0063645 A1 | 3/2016 | Houseworth et al. |
| 2016/0078567 A1 | 3/2016 | Goldman et al. |
| 2016/0092993 A1 | 3/2016 | Ciaramitaro |
| 2016/0092994 A1 | 3/2016 | Roebuck et al. |
| 2016/0098804 A1 | 4/2016 | Mascaro et al. |
| 2016/0148321 A1 | 5/2016 | Ciaramitaro et al. |
| 2016/0275627 A1 | 9/2016 | Wang |
| 2017/0004583 A1 | 1/2017 | Wang |
| 2017/0004584 A1 | 1/2017 | Wang |
| 2017/0032468 A1 | 2/2017 | Wang |

FOREIGN PATENT DOCUMENTS

| | | |
|---|---|---|
| JP | 2014-206960 A | 10/2014 |
| KR | 10-2012-0011987 A | 2/2012 |

OTHER PUBLICATIONS

PCT International Search Report for PCT/US2016/044094, Applicant: Intuit Inc., Form PCT/ISA/210 and 220, dated Apr. 24, 2017 (5pages).
PCT Written Opinion of the International Search Authority for PCT/US2016/044094, Applicant: Intuit Inc., Form PCT/ISA/237, dated Apr. 24, 2017 (5pages).
PCT International Search Report for PCT/US2016/067839, Applicant: Intuit Inc., Form PCT/ISA/210 and 220, dated Apr. 25, 2017 (5pages).
PCT Written Opinion of the International Search Authority for PCT/US2016/067839, Applicant: Intuit Inc., Form PCT/ISA/237, dated Apr. 26, 2017 (12pages).
Amendment dated May 3, 2017 in U.S. Appl. No. 14/462,411, filed Aug. 18, 2014, (5pages).
Response dated May 15, 2017 in U.S. Appl. No. 14/448,962, filed Jul. 31, 2014, (30pages).
Office Action dated May 15, 2017 in U.S. Appl. No. 14/462,345, filed Aug. 18, 2014, (57pages).
Office Action dated May 15, 2017 in U.S. Appl. No. 14/555,902, filed Nov. 28, 2014, (8pages).
Office Action dated May 2, 2017 in U.S. Appl. No. 14/698,733, filed Apr. 28, 2015, (31pages).
Final Office Action dated Jun. 6, 2017 in U.S. Appl. No. 14/462,411, (20pges).
Amendment After Final Office Action dated Jun. 6, 2017 in U.S. Appl. No. 14/448,922, (8pages).
Interview Summary dated Jun. 7, 2017 in U.S. Appl. No. 14/448,922, (2pages).
Advisory Action dated Jun. 14, 2017 in U.S. Appl. No. 14/448,922, (4pages).
Amendment After Final Office Action dated Jun. 20, 2017 in U.S. Appl. No. 14/448,922, (14pages).
Office Action dated May 26, 2017 in U.S. Appl. No. 14/553,347, (43pages).
Office Action dated Jun. 2, 2017 in U.S. Appl. No. 14/673,261, (65pages).
Office Action dated May 25, 2017 in U.S. Appl. No. 14/529,736, (42pages).
Office Action dated Jun. 6, 2017 in U.S. Appl. No. 14/462,315, (54pages).
Amendment and Response dated Jun. 2, 2017 in U.S. Appl. No. 14/448,986, (12pages).
Interview Summary dated Jun. 2, 2017 in U.S. Appl. No. 14/448,986, (3pages).
Office Action dated Jun. 7, 2017 in U.S. Appl. No. 14/555,334, (54pages).
Office Action dated Jun. 7, 2017 in U.S. Appl. No. 14/555,296, (7pages).
Response dated Jun. 7, 2017 in U.S. Appl. No. 14/555,543, (21pages).
Amendment dated Jun. 9, 2017 in U.S. Appl. No. 14/097,057, (26pages).
Office Action dated Jun. 22, 2017 in U.S. Appl. No. 14/698,746, (50pages).
Response to Restriction Requirement dated Jul. 5, 2017 in U.S. Appl. No. 14/555,902, (12pages).
PCT International Search Report for PCT/US2016/067866 Applicant: Intuit Inc., Form PCT/ISA/210 and 220, dated Jul. 26, 2017 (5pages).
PCT Written Opinion of the International Search Authority for PCT/US2016/067866, Applicant: Intuit Inc., Form PCT/ISA/237, dated Jul. 26, 2017 (4pages).
PCT International Search Report for PCT/US2016/067867 Applicant: Intuit Inc., Form PCT/ISA/210 and 220, dated Jul. 26, 2017 (5pages).
PCT Written Opinion of the International Search Authority for PCT/US2016/067867, Applicant: Intuit Inc., Form PCT/ISA/237, dated Jul. 26, 2017 (9pages).
Response to Office Action dated Jul. 17, 2017 in U.S. Appl. No. 14/462,345, (17pages).
Advisory Action dated Jul. 31, 2017 in U.S. Appl. No. 14/462,345, (3pages).
Request for Continued Examination and Response dated Aug. 14, 2017 in U.S. Appl. No. 14/462,345, (17pages).
Office Action dated Aug. 9, 2017 in U.S. Appl. No. 14/097,057, (47pages).
Interview Summary dated Sep. 6, 2017 in U.S. Appl. No. 14/553,347, (2pages).
Response dated Aug. 15, 2017 in U.S. Appl. No. 14/698,733, (24pages).
Response dated Aug. 10, 2017 in U.S. Appl. No. 14/448,678, (41pages).
Office Action dated Jul. 28, 2017 in U.S. Appl. No. 14/555,553, (52pages).
Office Action dated Aug. 21, 2017 in U.S. Appl. No. 14/755,684, (43pages).
Response dated Jul. 5, 2017 in U.S. Appl. No. 14/555,902, (12pages).
Office Action dated Sep. 8, 2017 in U.S. Appl. No. 14/555,939, (92pages).
Office Action dated Jun. 28, 2017 in U.S. Appl. No. 14/207,121, (29pages).
Office Action dated Sep. 14, 2017 in U.S. Appl. No. 14/557,335, (57pages).
Response dated Aug. 7, 2017 in U.S. Appl. No. 14/462,315, (10pages).
Advisory Action dated Aug. 24, 2017 in U.S. Appl. No. 14/462,315, (3pages).
Request for Examination and Response dated Sep. 6, 2017 in U.S. Appl. No. 14/462,315, (43pages).
Office Action dated Jun. 27, 2017 in U.S. Appl. No. 14/755,859, (174pages).
Advisory Action dated Jul. 5, 2017 in U.S. Appl. No. 14/448,922, (4pages).
Request for Continued Examination and Amendment dated Aug. 21, 2017 in U.S. Appl. No. 14/448,922, (37pages).
Request for Continued Examination and Amendment dated Sep. 6, 2017 in U.S. Appl. No. 14/448,922, (36pages).

(56) References Cited

OTHER PUBLICATIONS

Request for Continued Examination and Amendment dated Sep. 6, 2017 in U.S. Appl. No. 14/462,411, (24pages).
Office Action dated Aug. 25, 2017 in U.S. Appl. No. 14/673,646, (65pages).
Office Action dated Jun. 27, 2017 in U.S. Appl. No. 14/675,166, (46pages).
Response dated Jun. 23, 2017 in U.S. Appl. No. 14/555,293, (7pages).
Office Action dated Jul. 10, 2017 in U.S. Appl. No. 14/555,222, (63pages).
Office Action dated Aug. 18, 2017 in U.S. Appl. No. 14/555,543, (42pages).
Office Action dated Aug. 25, 2017 in U.S. Appl. No. 14/673,555, (71pages).
http://en.wikipedia.org/wiki/Dependency_grammar#Semantic_dependencies, printed Mar. 11, 2014.
http://www.webopedia.com/TERM/L/loose_coupling.html, printed Mar. 11, 2014.
http://en.wikipedia.org/wiki/Loose_coupling, printed Mar. 11, 2014.
www.turbotax.com, printed Mar. 11, 2014.
https://turbotax.intuit.com/snaptax/mobile/, printed Mar. 11, 2014.
http://www.jboss.org/drools/drools-expert.html, printed Mar. 11, 2014.
http://en.wikipedia.org/wiki/Drools, printed Mar. 11, 2014.
http://en.wikipedia.org/wiki/Declarative_programming, printed Mar. 11, 2014.
http://www.wisegeek.com/what-is-declarative-programming.htm, printed Mar. 11, 2014.
http://docs.jboss.org/drools/release/5.3.0.Final/drools-expert-docs/html/ch01.html, printed Mar. 11, 2014.
http://quicken.intuit.com/support/help/tax-savings/simplify-tax-time/INF24047.html, updated Jul. 25, 2013, printed Jun. 24, 2014 (11 pages).
http://quicken.intuit.com/support/help/income-and-expenses/how-to-assign-tax-form-line-items-to-a-category/GEN82142.html, updated Aug. 11, 2011, printed Jun. 24, 2014 (2 pages).
http://quicken.intuit.com/support/help/reports--graphs-and-snap-shots/track-the-earnings—taxes--deductions--or-deposits-from-paychecks/GEN82101.html, updated May 14, 2012, printed Jun. 24, 2014 (2 pages).
NY State Dep of Taxation, NY State Personal Income Tax MeF Guide for Software Developers, 2012, NY State.
Restriction Requirement dated May 22, 2015 in U.S. Appl. No. 14/097,057, filed Dec. 4, 2013, inventor: Gang Wang.
Response dated Jun. 30, 2015 in U.S. Appl. No. 14/097,057, filed Dec. 4, 2013, inventor: Gang Wang.
Office Action dated Oct. 2, 2015 in U.S. Appl. No. 14/097,057, filed Dec. 4, 2013, inventor: Gang Wang.
Response dated Feb. 29, 2016 in U.S. Appl. No. 14/097,057, filed Dec. 4, 2013, inventor: Gang Wang.
Final Office Action dated Apr. 8, 2016 in U.S. Appl. No. 14/097,057, filed Dec. 4, 2013, inventor: Gang Wang.
Pre-Appeal Brief dated Jun. 24, 2016 in U.S. Appl. No. 14/097,057, filed Dec. 4, 2013, inventor: Gang Wang.
Pre-Appeal Brief Conference Decision dated Aug. 15, 2016 in U.S. Appl. No. 14/097,057, filed Dec. 4, 2013, inventor: Gang Wang.
Amendment dated Sep. 13, 2016 in U.S. Appl. No. 14/097,057, filed Dec. 4, 2013, inventor: Gang Wang.
Office Action dated Nov. 4, 2016 in U.S. Appl. No. 14/097,057, filed Dec. 4, 2013, inventor: Gang Wang.
Amendment dated Feb. 6, 2017 in U.S. Appl. No. 14/097,057, filed Dec. 4, 2013, inventor: Gang Wang.
Final Rejection dated Mar. 9, 2017 in U.S. Appl. No. 14/097,057, filed Dec. 4, 2013, inventor: Gang Wang.
Office Action dated Dec. 23, 2016 in U.S. Appl. No. 14/462,345, filed Aug. 18, 2014, inventor: Gang Wang.
Amendment dated Mar. 23, 2017 in U.S. Appl. No. 14/462,345, filed Aug. 18, 2014, inventor: Gang Wang.
Office Action dated Mar. 10, 2017 in U.S. Appl. No. 14/448,678, filed Jul. 31, 2014, inventor: Gang Wang.
Office Action dated Jul. 8, 2015 in U.S. Appl. No. 14/206,682, filed Mar. 12, 2015, inventor: Gang Wang.
Response dated Aug. 31, 2015 in U.S. Appl. No. 14/206,682, filed Mar. 12, 2015, inventor: Gang Wang.
Office Action dated Mar. 9, 2016 in U.S. Appl. No. 14/206,682, filed Mar. 12, 2015, inventor: Gang Wang.
Amendment dated Jul. 11, 2016 in U.S. Appl. No. 14/206,682, filed Mar. 12, 2015, inventor: Gang Wang.
Office Action dated Sep. 16, 2016 in U.S. Appl. No. 14/206,682, filed Mar. 12, 2015, inventor: Gang Wang.
Amendment dated Jan. 13, 2017 in U.S. Appl. No. 14/206,682, filed Mar. 12, 2015, inventor: Gang Wang.
Office Action dated Dec. 31, 2015 in U.S. Appl. No. 14/206,834, filed Mar. 12, 2015, inventor: Gang Wang.
Amendment dated May 31, 2016 in U.S. Appl. No. 14/206,834, filed Mar. 12, 2015, inventor: Gang Wang.
Office Action dated Sep. 6, 2016 in U.S. Appl. No. 14/206,834, filed Mar. 12, 2015, inventor: Gang Wang.
Amendment dated Jan. 6, 2017 in U.S. Appl. No. 14/206,834, filed Mar. 12, 2015, inventor: Gang Wang.
Office Action dated Apr. 30, 2015 in U.S. Appl. No. 14/207,121, filed Mar. 12, 2015, inventor: Gang Wang.
Response dated Apr. 30, 2015 in U.S. Appl. No. 14/207,121, filed Mar. 12, 2015, inventor: Gang Wang.
Office Action dated Jul. 30, 2015 in U.S. Appl. No. 14/207,121, filed Mar. 12, 2015, inventor: Gang Wang.
Response dated Nov. 30, 2015 in U.S. Appl. No. 14/207,121, filed Mar. 12, 2015, inventor: Gang Wang.
Office Action dated Apr. 29, 2016 in U.S. Appl. No. 14/207,121, filed Mar. 12, 2015, inventor: Gang Wang.
Amendment dated Aug. 29, 2016 in U.S. Appl. No. 14/207,121, filed Mar. 12, 2015, inventor: Gang Wang.
Office Action dated Dec. 14, 2016 in U.S. Appl. No. 14/462,315, filed Aug. 18, 2014, inventor: Gang Wang.
Response dated Mar. 14, 2017 in U.S. Appl. No. 14/462,315, filed Aug. 18, 2014, inventor: Gang Wang.
Office Action dated Nov. 29, 2016 in U.S. Appl. No. 14/448,886, filed Jul. 31, 2014, inventor: Gang Wang.
Amendment dated Feb. 28, 2017 in U.S. Appl. No. 14/448,886, filed Jul. 31, 2014, inventor: Gang Wang.
Office Action dated Apr. 20, 2017 in U.S. Appl. No. 14/448,886, filed Jul. 31, 2014, inventor: Gang Wang.
Office Action dated Nov. 17, 2016 in U.S. Appl. No. 14/448,922, filed Jul. 31, 2014, inventor: Gang Wang.
Amendment dated Feb. 17, 2016 in U.S. Appl. No. 14/448,922, filed Jul. 31, 2014, inventor: Gang Wang.
Office Action dated Apr. 6, 2017 in U.S. Appl. No. 14/448,922, filed Jul. 31, 2014, inventor: Gang Wang.
Office Action dated Aug. 11, 2016 in U.S. Appl. No. 14/448,962, filed Jul. 31, 2014, inventor: Gang Wang.
Amendment dated Nov. 11, 2016 in U.S. Appl. No. 14/448,962, filed Jul. 31, 2014, inventor: Gang Wang.
Office Action dated Jan. 13, 2017 in U.S. Appl. No. 14/448,962, filed Jul. 31, 2014, inventor: Gang Wang.
Office Action dated Aug. 23, 2016 in U.S. Appl. No. 14/448,986, filed Jul. 31, 2014, inventor: Gang Wang.
Response dated Jan. 23, 2017 in U.S. Appl. No. 14/448,986, filed Jul. 31, 2014, inventor: Gang Wang.
Office Action dated Feb. 17, 2017 in U.S. Appl. No. 14/448,986, filed Jul. 31, 2014, inventor: Gang Wang.
Office Action dated Jan. 12, 2017 in U.S. Appl. No. 14/462,411, filed Aug. 18, 2014, inventor: Gang Wang.
Office Action dated Feb. 7, 2017 in U.S. Appl. No. 14/555,543, filed Nov. 26, 2014, inventor: Gang Wang.
PCT International Search Report for PCT/US2016/039919, Applicant: Intuit Inc., Form PCT/ISA/210 and 220, dated Oct. 11, 2016.
PCT Written Opinion of the International Search Authority for PCT/US2016/039919, Applicant: Intuit Inc., Form PCT/ISA/237, dated Oct. 11, 2016.

(56) References Cited

OTHER PUBLICATIONS

PCT International Search Report for PCT/US2016/039917, Applicant: Intuit Inc., Form PCT/ISA/210 and 220, dated Oct. 11, 2016.
PCT Written Opinion of the International Search Authority for PCT/US2016/039917, Applicant: Intuit Inc., Form PCT/ISA/237, dated Oct. 11, 2016.
PCT International Search Report for PCT/US2016/039918, Applicant: Intuit Inc., Form PCT/ISA/210 and 220, dated Oct. 11, 2016.
PCT Written Opinion of the International Search Authority for PCT/US2016/039918, Applicant: Intuit Inc. Form PCT/ISA/237, dated Oct. 11, 2016.
PCT International Search Report for PCT/US2016/039913, Applicant: Intuit Inc., Form PCT/ISA/210 and 220, dated Oct. 21, 2016.
PCT Written Opinion of the International Search Authority for PCT/US2016/039913, Applicant: Intuit Inc. Form PCT/ISA/237, dated Oct. 21, 2016.
PCT International Search Report for PCT/US2016/039916, Applicant: Intuit Inc., Form PCT/ISA/210 and 220, dated Oct. 11, 2016.
PCT Written Opinion of the International Search Authority for PCT/US2016/039916, Applicant: Intuit Inc. Form PCT/ISA/237, dated Oct. 11, 2016.
Amendment and Response dated Nov. 9, 2017 in U.S. Appl. No. 14/097,057, (31pgs.).
Amendment and Response dated Oct. 26, 2017 in U.S. Appl. No. 14/553,347, (25pgs.).
Amendment and Response dated Nov. 2, 2017 in U.S. Appl. No. 14/673,261, (30pgs.).
Office Action dated Oct. 30, 2017 in U.S. Appl. No. 14/448,678, (39pgs.).
Amendment and Response dated Oct. 30, 2017 in U.S. Appl. No. 14/555,553, (17pgs.).
Notice of Allowance dated Nov. 3, 2017 in U.S. Appl. No. 14/529,736, (13pgs.).
Interview Summary dated Sep. 28, 2017 in U.S. Appl. No. 14/529,736, (3pgs.).
Office Action dated Sep. 14, 2017 in U.S. Appl. No. 14/530,159, (41pgs.).
Amendment and Response dated Nov. 21, 2017 in U.S. Appl. No. 14/755,684, (23pgs.).
Office Action dated Nov. 15, 2017 in U.S. Appl. No. 14/206,834, (100pgs.).
Office Action dated Sep. 8, 2017 in U.S. Appl. No. 14/555,939, (92pgs.).
Amendment and Response dated Sep. 28, 2017 in U.S. Appl. No. 14/207,121, (38pgs.).
Office Action dated Sep. 14, 2017 in U.S. Appl. No. 14/557,335, (57pgs.).
Amendment and Response dated Aug. 7, 2017 in U.S. Appl. No. 14/462,315, (10pgs.).
Advisory Action dated Aug. 24, 2017 in U.S. Appl. No. 14/462,315, (3pgs.).
Amendment and Response and Request for Continued Examination dated Sep. 6, 2017 in U.S. Appl. No. 14/462,315, (43pgs.).
Vanderbilt University, "Free tax prep help available for Vanderbilt employees", Feb. 6, 2014, Vanderbilt University, p. 1-3.
Office Action dated Jun. 22, 2017 in U.S. Appl. No. 14/698,746, (50pgs.).
Amendment and Response dated Sep. 22, 2017 in U.S. Appl. No. 14/698,746, (26pgs.).
Office Action dated Oct. 13, 2017 in U.S. Appl. No. 14/462,397, (72pgs.).
Office Action dated Nov. 30, 2017 in U.S. Appl. No. 14/462,373, (72pgs.).
Office Action dated Jun. 27, 2017 in U.S. Appl. No. 14/755,859, (174pgs.).
Amendment and Response dated Nov. 27, 2017 in U.S. Appl. No. 14/755,859, (53pgs.).
Amendment and Response dated Jun. 20, 2017 in U.S. Appl. No. 14/448,886, (14pgs.).
Advisory Action dated Jul. 5, 2017 in U.S. Appl. No. 14/448,886, (4pgs.).
Amendment and Response dated Aug. 21, 2017 in U.S. Appl. No. 14/448,886, (37pgs.).
Office Action dated Nov. 28, 2017 in U.S. Appl. No. 14/448,886, (65pgs.).
Amendment and Response and Request for Continued Examination dated Sep. 6, 2017 in U.S. Appl. No. 14/448,922, (36pgs.).
Office Action dated Nov. 28, 2017 in U.S. Appl. No. 14/448,922, (65pgs.).
Office Action dated Oct. 10, 2017 in U.S. Appl. No. 14/448,962, (27pgs.).
Office Action dated Oct. 16, 2017 in U.S. Appl. No. 14/448,986, (30pgs.).
OpenRules, Preparing a Tax Return Using OpenRules Dialog, Aug. 2011 (Year: 2011) (25pgs.).
Amendment and Response and Request for Continued Examination dated Sep. 6, 2017 in U.S. Appl. No. 14/462,411, (24pgs.).
Amendment and Response dated Nov. 7, 2017 in U.S. Appl. No. 14/555,334, (26pgs.).
Advisory Action dated Nov. 22, 2017 in U.S. Appl. No. 14/555,334, (2pgs.).
Office Action dated Oct. 11, 2017 in U.S. Appl. No. 14/701,030, (53pgs.).
Office Action dated Aug. 25, 2017 in U.S. Appl. No. 14/673,646, (65pgs.).
Office Action dated Jul. 10, 2017 in U.S. Appl. No. 14/555,222, (63pgs.).
Amendment and Response dated Nov. 10, 2017 in U.S. Appl. No. 14/555,222, (25pgs.).
Office Action dated Nov. 3, 2017 in U.S. Appl. No. 14/701,087, (103pgs.).
Office Action dated Jun. 27, 2017 in U.S. Appl. No. 14/675,166, (46pgs.).
Amendment and Response dated Oct. 27, 2017 in U.S. Appl. No. 14/675,166, (25pgs.).
Response dated Jun. 23, 2017 in U.S. Appl. No. 14/555,296, (7pgs.).
Office Action dated Oct. 20, 2017 in U.S. Appl. No. 14/555,296, (50pgs.).
Office Action dated Aug. 18, 2017 in U.S. Appl. No. 14/555,543, (42pgs.).
Interview Summary dated Oct. 25, 2017 in U.S. Appl. No. 14/555,543, (3pgs.).
Office Action dated Sep. 25, 2017 in U.S. Appl. No. 14/700,981, (52pgs.).
Office Action dated Aug. 25, 2017 in U.S. Appl. No. 14/673,555, (65pgs.).
Office Action dated Sep. 28, 2017 in U.S. Appl. No. 14/701,149, (71pgs.).

\* cited by examiner

|   | A | B | C | D | E | F | G | Goal |
|---|---|---|---|---|---|---|---|------|
| R1 | Y | ? | N | ? | ? | ? | ? | Yes |
| R2 | Y | ? | Y | ? | ? | ? | Y | Yes |
| R3 | N | Y | ? | ? | ? | ? | Y | Yes |
| R4 | N | Y | ? | N | N | N | ? | Yes |
| R5 | N | N | ? | ? | ? | N | ? | Yes |

FIG. 7

| User Attribute | User Attribute Data | Question 461 | Modify Question? | Modified Question 461m |
|---|---|---|---|---|
| Age | 0-65 | Are you 65 or older? | Y | You are older than 65, right? |
| Age | 65+ | Are you 65 or older? | N | |
| Attribute a | Data a | Question a | | |
| Attribute b | Data b | Question b | | |
| Attribute n | Data n | Question n | | |

FIG. 9

First / Original Question:
461

1102
Are you 65 or older?

Second / Modified Question:
461m

We think you are younger than 65, right? ← 1130

| Answer to First Q | Meaning of Answer | Answer to 2nd / Modified Q | Meaning of Answer |
|---|---|---|---|
| Y | Older than 65 | Y | Younger than 65 |
| N | Younger than 65 | N | Older than 65 | same — opposite/different

FIG. 12

| Answer to First Q | Meaning of Answer | Answer to 2nd / Modified Q | Meaning of Answer |
|---|---|---|---|
| Y | Older than 65 | N | Older than 65 |
| N | Younger than 65 | Y | Younger than 65 | opposite/different — same

FIG. 13

First / Original Question:  Are you 65 or older?
461

Second / Modified Question:  Are you married male older than 65?
461m                                    ⏟      ⏟        ⏟
(CQ)                                   1401a  1401b   1401c

FIG. 15

INTERVIEW QUESTION MODIFICATION DURING PREPARATION OF ELECTRONIC TAX RETURN

SUMMARY

Embodiments are directed to changing how questions are presented to a user of a tax return preparation application.

Certain embodiments are directed to modifying a question that is selected by a rule engine that operates independently of a user interface (UI) management module or UI controller such that tax logic and tax rule determinations are separate or disconnected from interview screens (in contrast to known tax return preparation applications that have tax logic integrated or programmed within interview screens), and providing the modified question to a UI controller, which presents the modified question to the user through an interview screen generated by the UI controller.

Certain embodiments are directed to modifying or twisting how a question is presented and the meaning of an answer to a twisted or modified question relative to an answer of an original or unmodified question. Question modification or twisting may involve restructuring, rephrasing or rewording questions such that answering an original question with a binary answer (e.g., "yes") has a different meaning relative to answering the modified question with the same binary answer ("yes"). For example, an original question may be flipped or twisted to be phrased in an "opposite" manner such that a "yes" answer to the original question has the same or substantially similar meaning as a "no" answer to the modified question. Embodiments may involve modifying or twisting a single original question into a single modified question and other modifications involving combining multiple questions or sub-questions including a sub-question directed to a topic of an original question, into a single question such that a single response to the modified question applies to each sub-question.

Certain embodiments are directed to modifying or twisting how a question is presented to a user of a tax return preparation application in order to convey to the user that the tax return preparation application already knows certain data about the user and to provide a more positive tax return preparation experience to the user.

Certain embodiments are directed to modifying or twisting how a question is presented to a user of a tax return preparation application in order to encourage positive responses such that the user will be more likely to respond in a positive manner (e.g., by answering "yes") to the modified questions that would otherwise be answered "no" if an original question were asked instead.

Certain embodiments are directed to modifying or twisting an original question that is consistent with or based on a data model or schema of the tax return preparation application into a rephrased or reworded question that may not be consistent with or based on the data model or schema. An answer to the rephrased or reworded question is converted, mapped or "untwisted" so that the resulting answer determined to correspond to the first question is consistent with or specified by the model or schema for subsequent processing.

Certain embodiments are directed computer-implemented methods, computerized systems and articles of manufacture or computer program products that twist, change, rephrase or modify a question that is to be presented to a user of a tax preparation application in real time during preparation of the electronic tax return. Thus, a user is presented with and answers a modified question, and then the answer to the modified question is converted or mapped to an answer of the original question.

For example, one embodiment is directed to a computer-implemented method for presenting a personalized interview question to a user of a tax return preparation application during preparation of an electronic tax return and comprises a computer executing the tax return preparation application selecting a first or original question to be presented to a user of the tax preparation application during preparation of the electronic tax return. According to one embodiment, the first question may be selected as a result of a rule engine determining how rules apply to current runtime data of the electronic tax return to select one or more questions that are the subject of a non-binding suggestion that is provided to a UI management module or controller. The method further comprises the computer determining data of a pre-determined attribute of the user based at least in part upon the current runtime data of the electronic tax return and determining a second question that is modified relative to the first question based at least in part upon the pre-determined attribute data. For example, the second question may be restructured, rephrased or reworded based at least in part upon the user's demographic data such as age, residence location. As another example, the second question may be restructured, rephrased or reworded based at least in part upon a type of computing device that is executing the tax return preparation application. The method further comprises the computer presenting the second question to the user through an interview screen generated by the tax return preparation application and receiving an answer to the second question (rather than the first, original question) through the interview screen.

Another embodiment is directed to a computer-implemented method for presenting a personalized interview question to a user of a tax return preparation application during preparation of an electronic tax return and comprises a computer executing the tax return preparation application that includes a rule engine, a question modification module and a UI management module or controller. The rule engine selects a first or original question to be presented to the user of the tax preparation application during preparation of the electronic tax return, and the modification module, which is in communication with the rule engine, determines data of a pre-determined attribute of the user based at least in part upon current runtime data of the electronic tax return and determines a second question based at least in part upon the pre-determined attribute data. The second question is a modified version of the first question in that the second question restructures, rewords or rephrases how the original question is asked. The second question is provided by the modification module to the UI management module or controller, which determines whether and when to present the second question to the user through an interview screen. When the second question is presented to the user, the UI management module or controller receives an answer to the second question through the interview screen.

Yet other embodiments are directed to non-transitory computer-readable medium or computer program product comprising instructions, which when executed by a processor of a computing device, cause the computing device to execute a process for presenting a personalized interview question to a user of a tax return preparation application during preparation of an electronic tax return or determining and presenting a different, modified or twisted question to the user and processing the answer to the modified question to determine a corresponding answer to an original question.

Yet other embodiments are directed to computerized systems for presenting a personalized interview question to a user of a tax return preparation application during preparation of an electronic tax return or determining and presenting a modified or twisted question to the user and processing the answer to the modified question to determine a corresponding answer to an original question. One embodiment of a computerized system comprises a rule engine or logic agent, a question modification module and a UI management module or controller. According to one embodiment, the modification module is in communication with the rule engine and the UI management module or controller, and may be in communication with a data store shared among these components to read electronic tax return data there from. The rule engine or logic agent is configured or operable to read stored electronic tax return data and use rules defined by a decision table to identify a candidate question to be presented to the user. The candidate question may be part of or the subject of a non-binding suggestion that is generated by the rule engine for the UI management module or controller. The modification module receives data of the candidate question, converts the candidate question into a modified question or determines a modified question that rephrases or rewords candidate question, and provides the modified question to the UI management module or controller, which processes the suggestion/modified question. When the modified question is processed, it is presented to the user through an interview screen generated by the UI management module or controller, which receives an answer to the modified question from the user through the interview screen.

In a single or multiple embodiments, a second or modified question is automatically determined, e.g., in response to the modification module receiving certain electronic tax return or instance data from the data store or determining that the user is utilizing a certain type of computing device. According to another embodiment, the user requests a more personalized experience through the tax return preparation application, and modified questions are determined in response to the user request and based on the electronic tax return or instance data.

In a single or multiple embodiments, after an answer to a second or modified question has been converted or mapped to a corresponding answer to a first or original question, the rule engine may read or request data from the data store. In response, the data store may respond with a corresponding answer, which may be the result of conversion, mapping or "untwisting" of the answer to the second or modified question, or conversion, mapping or untwisting (if needed) may be performed in response to the request. In both cases, the corresponding or converted, mapped or untwisted answer is provided or served to the rule engine in response to the request rather than the answer to the second or modified question. In this manner, the rule engine can operate in a manner that is consistent with the data model or schema to execute rules derived from a decision table (which may not specify the manner in which a modified question is phrased), while the modified question determinations and conversions or mapping that may not be consistent with the data model or schema can be performed independently of the rule engine by the modification module.

In a single or multiple embodiments, the first or original question is in a format of a question concerning user data and requests a binary or "yes/no" answer such as "Are you older than 65?" whereas the second or modified question is in a different question format. For example, the second or modified question may be phrased to include an assumption, determination or assessment about the user such as "We believe you are younger than 65, correct?"

In a single or multiple embodiments, the first or original question that is modified or twisted is not presented to the user, and an answer to the first or original question is derived from the answer to the second or modified question as a result of converting, mapping or untwisting the received answer into an answer to the first or original question. Thus, while the user does not answer the first or original question directly, and may not even be presented with the first question at all, embodiments determine or derive an answer to the first question based on an answer to a different question.

In a single or multiple embodiments, the second or modified question is twisted relative to the first or original question such that the same answer to both questions conveys different meanings, whereas different answers to the first or original question and to the second or modified question convey the same or substantially similar meanings.

In a single or multiple embodiments, pre-determined attribute data used to determine or select a second or modified question is demographic data of the user. For example, a second or modified question may be used instead of a first or original question that is consistent with the data model or schema in cases in which the user is younger than a pre-determined age or the user utilizes a certain type of computing device such as a mobile communication device (which may also be indicative of age). Once the pre-determined attribute data has been received or determined, the second or modified question may be determined or selected by, for example, searching a table that associates pre-determined attributes, attribute data and a second or modified question to be used instead of a first or original question based on that attribute data, or by transforming a first or original question into a second or modified question by, for example, expressing one or more portions of the original question in a different way, e.g., opposite of what is recited in the first or original question.

In a single or multiple embodiments, whether question modification is performed is based at least in part upon probabilities of a positive user answers or responses. In one embodiment, a first probability of a positive response to the first or original question and a second probability of a positive response to the second or modified question are determined (e.g., based on statistical data or data of other tax users with similar demographic data), and a second or modified question is selected for presentation to the user when the second probability is greater than the first probability, else the original question can be presented.

In a single or multiple embodiments, question modification may involve aggregating multiple questions into a second or modified question such that the second or modified question includes multiple question elements or sub-questions to which a single response applies. These question elements or sub-questions may all be based on a data model or schema of the tax return preparation application such that when an answer is received to the modified question, that same answer can be applied to all question elements or sub-questions. This may involve parsing the second or modified question into respective individual sub-questions and storing the received answer as the answer to each of the individual sub-questions in a data store. In another embodiment, at least one of the question elements or sub-questions is not consistent with or based on the data model or schema of the tax return preparation application. Thus, for certain sub-questions that are consistent with the data model or schema, the received answer can be applied to each of those consistent sub-questions, whereas for the others sub-questions that are not consistent with the data model or schema, the answers thereto can be converted, mapped or untwisted into a corresponding answer to a question that is supported by the data model or schema. The converted, mapped or untwisted answer is then stored to the data store and in a format consistent with or specified by the data model or schema.

BRIEF DESCRIPTION OF THE DRAWINGS

FIG. 7 illustrates an example of how a rule engine may process a decision table when determining which question to select;

FIG. 9 is a table illustrating how data of pre-determined user attributes can be mapped or linked to certain original questions and modified questions;

FIG. 11 illustrates an example of how a first or original question can be transformed into a modified question and includes a twisting element according to one embodiment;

FIG. 12 is a table illustrating how the first question and answers thereto are twisted or not consistent with the second question and answers thereto such that the same answers to the questions have different meanings;

FIG. 13 is another table illustrating how the first question and answers thereto are twisted or not consistent with the second question and answers thereto such that different answers to the questions have the same or substantially similar meanings;

FIG. 15 illustrates an example of how question modification shown in FIG. 14 may be implemented;

DETAILED DESCRIPTION OF ILLUSTRATED EMBODIMENTS

Embodiments are directed to computer-implemented methods, computerized systems and articles of manufacture or computer program products for modifying interview questions during preparation of an electronic tax return with a tax return preparation application.

In contrast to known tax preparation applications that utilize pre-determined questions and pre-determined question sequences that are programmed within and presented as part of an interview screen, and that involve manual interview screen coding and binding of an interview screens and associated tax logic, embodiments involve a modular interview engine that employs a rule engine or logic agent and UI management module or controller that are loosely coupled to each other such that the rule engine is dedicated to using tax or tax return related rules to generate results in the form of non-binding suggestions or recommendations for the UI controller. The UI controller then decides whether and when to generate or select an interview screen including the subject matter of the non-binding suggestion. A non-binding suggestions may refer to or include a candidate or potential question identified by the rule engine based on the rule engine's analysis of runtime data and rules specified by a decision table derived from a completeness graph representing tax law or tax return requirements. With embodiments, a modification module receives a first question or non-binding suggestion including a first question and generates or selects a modified or twisted question that involves the topic of the first question but restructures or rewords or rephrases the first question. For example, the first or original question may as "Are you older than 65?" whereas the second or modified question may be "We believe you are older than 65, right?" Thus, the meaning conveyed by the question may be twisted, and in this example, a positive response to the first question has a different meaning or result compared to a positive response of the second question.

Question or semantic twisting achieved with embodiments can be utilized to provide a more personalized tax return preparation experience, e.g., by crafting or modifying questions in view of a user's age or other demographic data, a type of computing device utilized by the user, and promoting positive responses or responses confirming assumptions made by the tax return preparation application were correct in order to provide a more positive impression of the tax return preparation application and its capabilities to the user, in contrast to the user answer "no" or "that is not correct" which may leave the user with a less positive or negative impression of the tax return preparation application. Further details regarding embodiments are described with reference to FIGS. 1-21.

Figure 1:
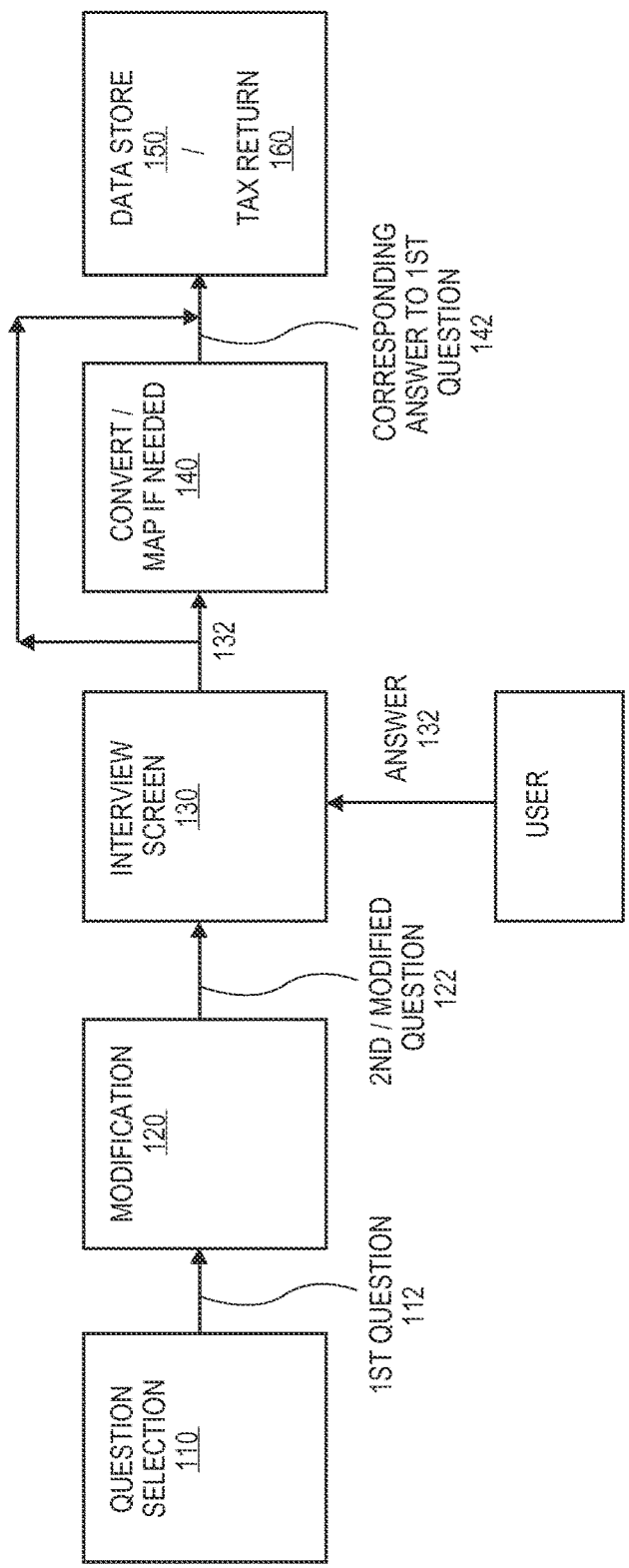
FIG. 1 is a system flow diagram illustrating an embodiment directed to modifying tax return preparation application interview questions.
Figure 2:
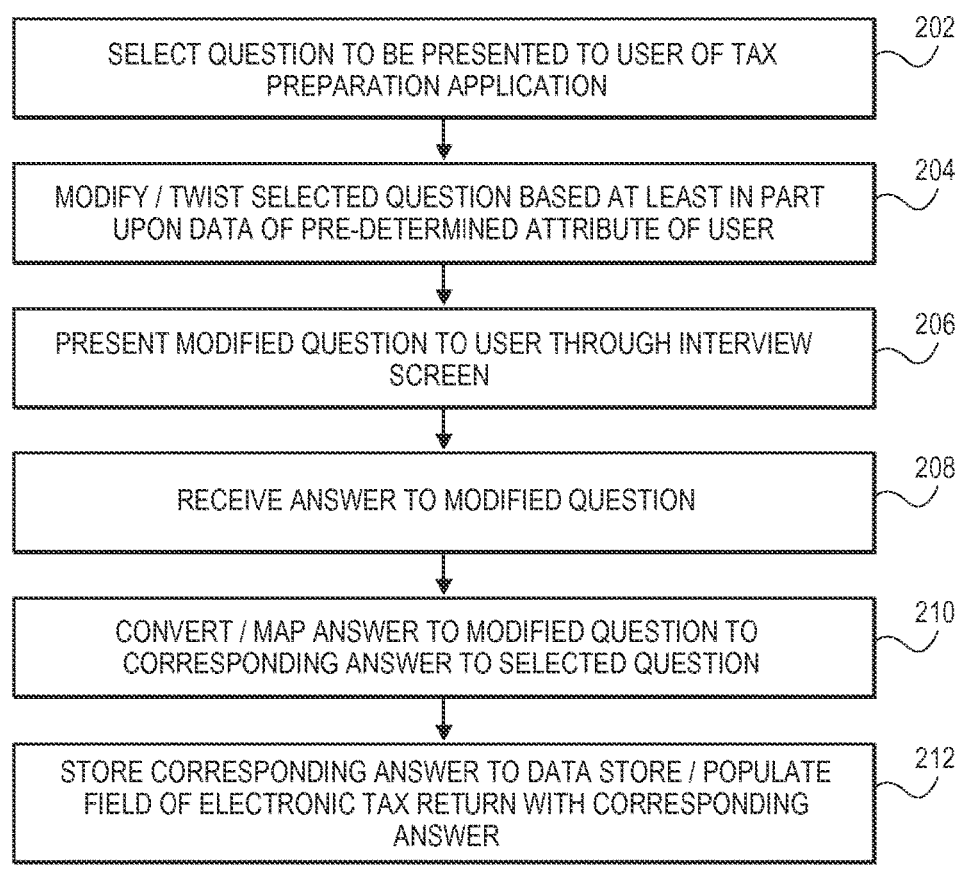
FIG. 2 is a flow diagram of one embodiment of a computer-implemented method for modifying tax return preparation application interview questions.

Referring to FIGS. 1-2, according to one embodiment, question modification according to embodiments comprises or involves a question selection module 110, such as a logic agent or rule engine (generally, rule engine), which, at 202, selects a first or original question 112. The first question 112 is received and processed by a question modification module 120, which at 204, generates or selects a second or modified question 122. At 206, the second question 122 is presented to the user through an interview screen 130, and at 208, the user responds or answers 132 the second question 122. The user may be the taxpayer or an accountant or tax professional that is preparing the electronic tax return on behalf of the taxpayer. For ease of explanation, reference is made generally to the user of the tax return preparation application. Since the answer 132 is an answer to the second question 122, rather than to the first question 112, the answer 132 and/or second question 122 may not be consistent with or supported or specified by a data model or schema utilized by the tax return preparation. Thus, at 210, the received answer 132 provided as an input to a conversion or mapping module 140 if necessary (which may be part of the conversion module 120 or a separate module), in order to "untwist" the answer 122 and determine or derive a corresponding answer 142 to the first question 112 at 210. The corresponding answer 142 is consistent with or supported by the data model or schema and stored to a data store 150, and 212 can be used by the rule module 110 for subsequent question selection and for populating fields of electronic tax return 160. If conversion or mapping is not necessary, the "untwisting" can be bypassed and the answer data store to the data store 150 and used to populate the electronic tax return 160.

Thus, embodiments derive an answer 142 to the first question 112 without presenting the first question 112 to the user, through use of an intermediate, modified question 122 and processing of the answer 132 thereto. Further aspects of embodiments described above and system components of other embodiments are described with reference to FIGS. 3-4, and further details regarding how question modification can be performed are described with reference to FIGS. 5-21.

Figure 3:
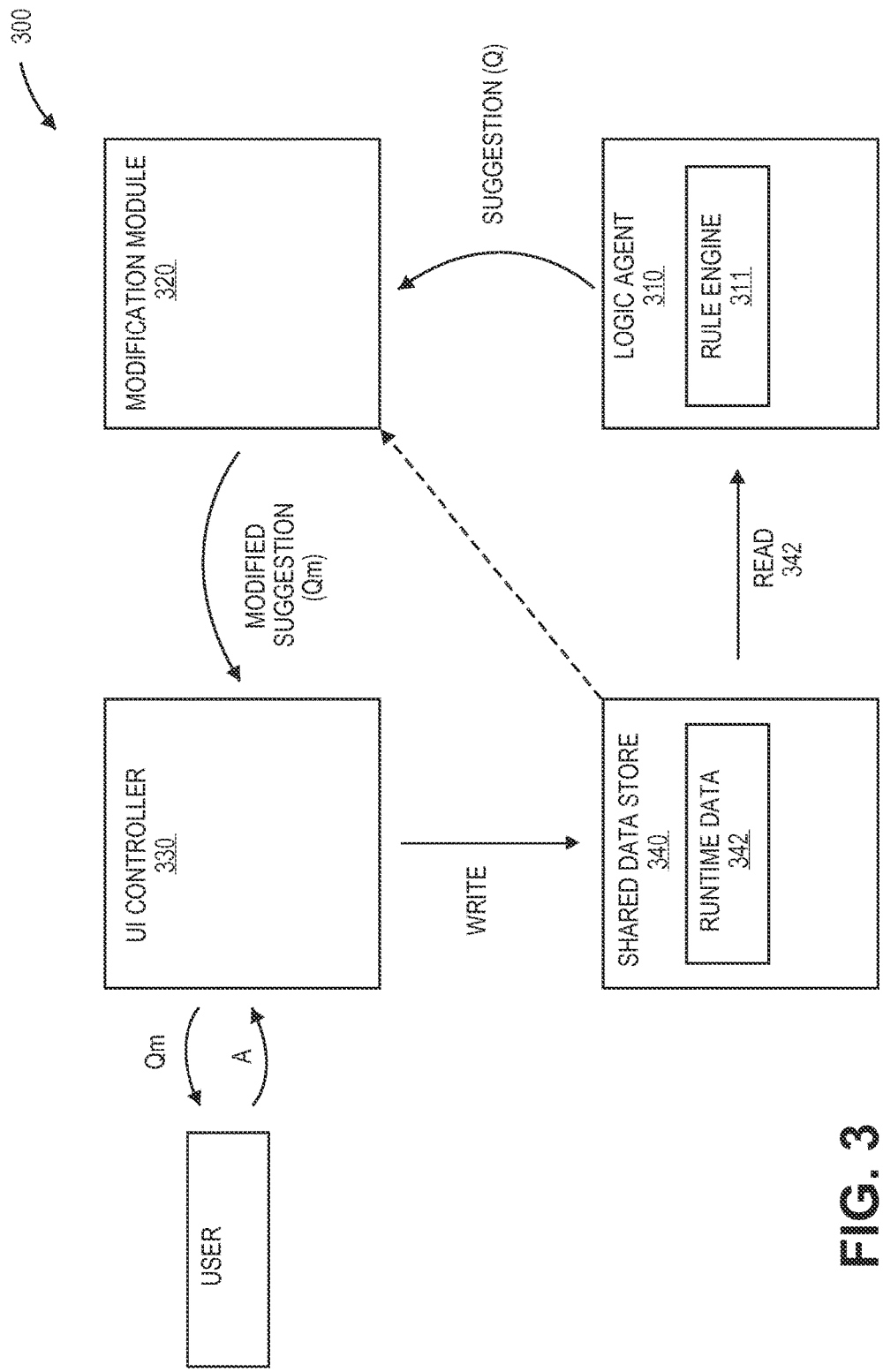
FIG. 3 is a system flow diagram illustrating an embodiment directed to modifying tax return preparation application interview questions that are subject of a non-binding suggestion.

Referring to FIG. 3, in a system 300 constructed according to one embodiment, a logic agent 310 comprising a rule engine 312 is in communication with a question modification module 320, which is also in communication with a UI management module or controller (UI controller 330). These components are in communication with an intermediate or shared data store 340. For example, the logic agent 110 can read runtime data 342 from the data store 340, the UI controller 330 can write data (e.g., an answer provided by the user) to the data store 340, and the question modification module 320 can read data from the data store 340 and/or from the logic agent 310.

Figure 4:
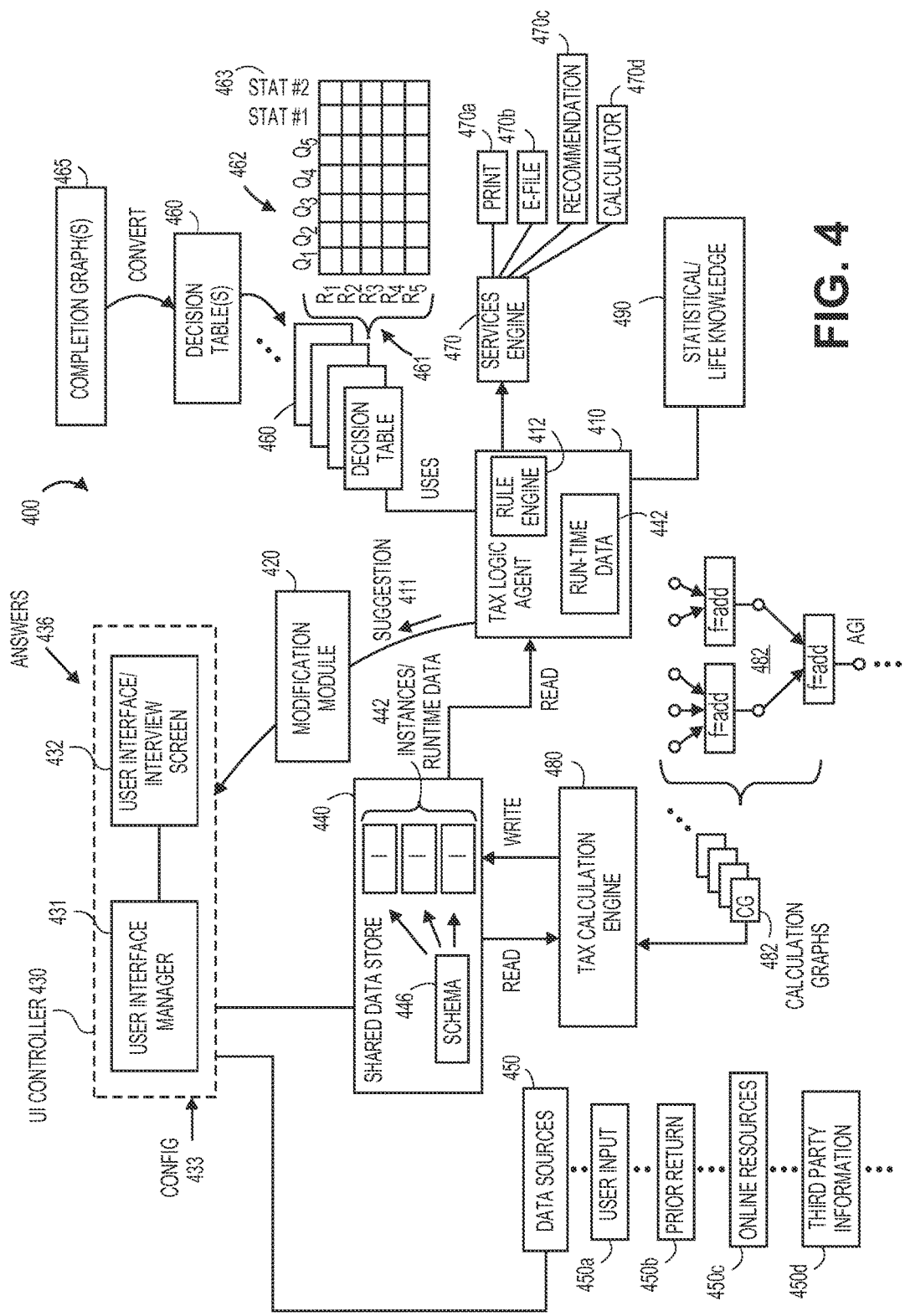
FIG. 4 illustrates a system constructed according to one embodiment FIG. 3 for modifying tax return preparation application interview questions that are subject of a non-binding suggestion and that includes or involves modification module in communication between a logic agent and a user interface controller.

FIG. 4 is a more detailed illustration of a system 400 constructed according to one embodiment. The system 400 includes the logic agent 410 comprising or executing a rule engine 412 based on runtime data 442, a modification module 420, a UI controller 430 and a shared or intermediate data store 440, and a tax calculation engine 450.

The rule engine 412, one example of which is a drools expert engine, receives runtime or instance data 442 that is based on a "dictionary" of terms of a data model or schema 446 (generally, schema 446). For example, the schema 446 may specify, define or list tax-related concepts or terms, e.g., by names, type or category and hierarchy such as "name," "social security number," "citizenship," "address," "employer," "interest," "dividends," "mortgage," "deduction," "tax credit," "capital gain," etc. An instance 447 is instantiated or created for the collection of data received and for each term or topic of the schema 446. The schema 446 may also specify a certain format of questions and answers (e.g., answer is binary (Y/N), a number of value). It will be understood that the schema 446 may define hundreds or thousands of such concepts or terms and may be defined in various ways, one example is based on an Extensible Markup Language (XML) schema. Non-limiting examples of schemas 446 that may be utilized in embodiments include Modernized E-File (MeF) and MeF++ schemas. It will be understood that embodiments may utilize various other schemas, and that a schema such as MeF is provided as a non-limiting example of a schema 446 that may be utilized in embodiments.

The runtime or instance data (generally, runtime data 442) stored in the shared data store 440 is used to populate corresponding fields of an electronic tax return or electronic tax form used to prepare an electronic tax return and may be received from various data sources 450a-d (generally, source) including user input or a user answer 436/450a to a question presented in an interview screen, data imported from a prior electronic tax return, online resources (such as online social networks) and third parties databases or resources. The rule engine 412 reads the runtime or instance data 442 from the shared data store 440 and utilizes or executes rules 461 using that data in order to determine which questions 462 still need to be presented to the user.

The rule engine 412 utilizes rules 461 expressed in a decision table 460 and the runtime data 442. Various types of rules 461 may be utilized by embodiments. For example, "tax" rules 461 that are utilized by the rule engine 412 may specify which types of data or tax documents are required, or which fields or forms of the electronic tax return should be completed. One example is if a taxpayer is married, then the electronic tax return is required to include information about a spouse. A tax rule 461 may involve if a certain box on a form (e.g., Box 1 of Form W2) is greater than a pre-determined amount, then certain fields of the electronic tax return (e.g., withholding fields) cannot be left empty and must be completed. Thus, tax rules 461 may reflect various tax requirements and are expressed using the concepts or terms of the data model or schema 446. As another example, other rules 461 may specify tax consequences or calculations and for this purpose, the logic agent 410 may be in communication with other modules or services 470a-d (generally, "Additional Services" such as printing, e-filing, tax recommendations, calculation).

As yet another example, rules 461 also be used for the purpose of identifying or narrowing which questions 462 are identified as potential questions to be presented to the user. This may involve utilizing rules 461 based on one or more associated data structures such as a decision table 460, which is based on a completion graph 465, which recites, for example, the requirements of a tax authority or a tax authority rule or law. The decision table 460 may be used for invalidation of potential questions 461 or topics and input or runtime data 442 requirements.

Figure 5:
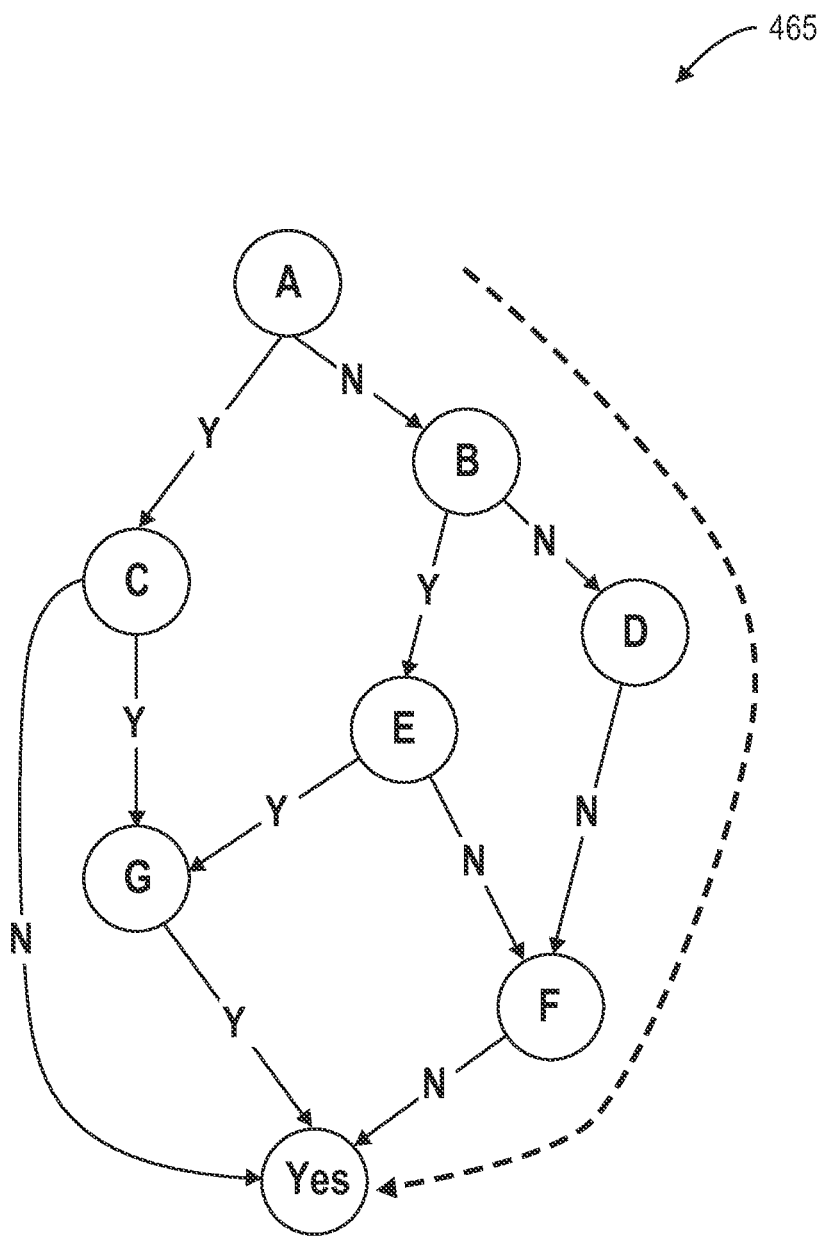
FIG. 5 illustrates an example of a directed graph or completeness graph.
Figure 6:
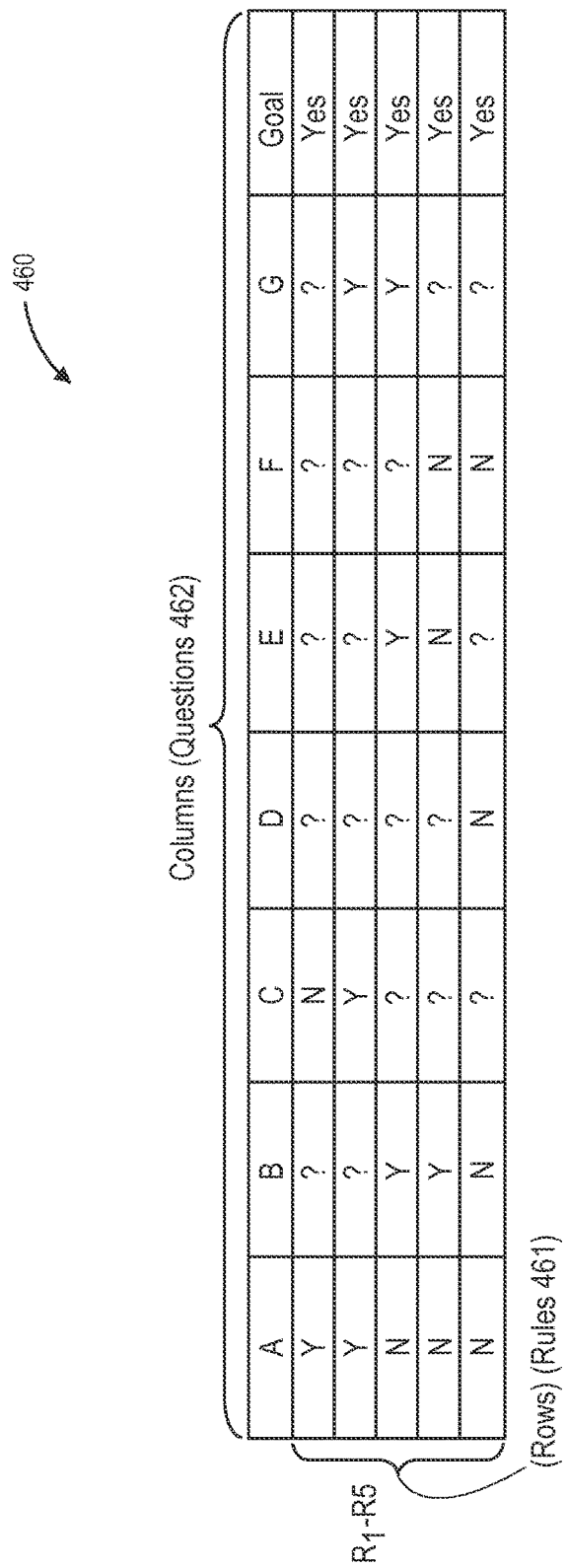
FIG. 6 is an example of a decision table generated based on the directed graph or completeness graph shown in FIG. 5, in which rows specify rules, and columns identify questions.

For example, referring to FIGS. 5-7, and as described in further detail in U.S. application Ser. No. 14/097,057, filed Dec. 4, 2013, entitled Methods Systems and Computer Program Products for Applying Generated Rules for Personalized Interview Experience" and U.S. application Ser. No. 14/206,834, filed Mar. 12, 2014, entitled "Computer Implemented Methods Systems and Articles of Manufacture for Suggestion-Based Interview Engine for Tax Return Preparation Application, the contents of which are expressly incorporated herein by reference as though set forth herein in full, a completeness or directed graph 465 reflects a flow of questions and answers of requirements, rules or laws a tax authority (as generally illustrated in FIG. 5), and the directed graph 465 is converted into a decision table 460 (as generally illustrated in FIG. 6) that reflects the question-and-answer flow of the completeness or directed graph 465. In the illustrated example, rows of the decision table 460 define rules 461 (R1-R5), and columns of the decision table 460 indicate questions 462 (Q1-Q5 shown in FIG. 4, or Questions A-G shown in FIG. 5) that can be selected by the rule engine 412 to be presented to the user.

In one embodiment, statistical data 463 (which may be appended as columns to the rule-question decision table 460, and received from or based on data collected by statistical/life knowledge module 490 described in further detail below) may indicate how likely a question 462 is to be relevant to a user given a set of runtime data 442 and may be utilized by the rule engine 442 when determining which question or topic 462 to select.

The logic agent 410 may also receive or otherwise incorporate information from a statistical/life knowledge module 490. The statistical/life knowledge module 490 contains statistical or probabilistic data related to the current or other users of the tax return preparation application and/or other taxpayers. For example, statistical/life knowledge module 490 may indicate that taxpayers residing within a particular zip code are more likely to be homeowners than renters. The logic agent 410 may use this knowledge to weight particular topics or questions related to these topics when processing rules 461 and questions 462 and generating non-binding suggestions 411. For example, questions 461 about home mortgage interest may be promoted or otherwise given a higher weight for users in particular zip codes or income levels. Statistical knowledge may apply in other ways as well. For example, tax forms often require a user to list his or her profession. These professions may be associated with transactions that may affect tax liability. For instance, a taxpayer may list his or her occupation as "teacher." The statistic/life knowledge module 490 may contain data that shows that a large percentage of teachers have retirement accounts such as 403(b) retirement accounts. This information may then be used by the logic agent 410 when generating its suggestions 411. For example, rather than asking generically about retirement accounts, the suggestion 411 can be tailored directly to a question about 403(b) retirement accounts.

Data that is contained within the statistic/life knowledge module 490 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 490. This information may be periodically refreshed or updated to reflect the most up-to-date relationships. Generally, the data contained in the statistic/life knowledge module 490 is not specific to a particular tax payer but is rather generalized to characteristics shared across a number of tax payers although in other embodiments, the data may be more specific to an individual taxpayer.

In one embodiment, the rule engine 412 uses the decision table 460 to eliminate rules 461 that may apply which, is used to eliminate candidate questions 462 from consideration rather than requiring the user to step through each question of a pre-determined sequence of questions in order to conclude that a particular tax situation or topic applies to the user.

More specifically, continuing with the example shown in FIGS. 5-6, and with further reference to FIG. 7, the runtime or instance data 442 that is known is used to determine which rows or rules 461 to cross out in the decision table 460. For example, if it is known from the runtime or instance data 442 that the answer to Question A is "Y" then rules involving a "N" answer to Question A are not applicable, and those rows of the decision table 460 including a "N" answer to Question A (i.e., the bottom three rows in the illustrated example) can be crossed out or eliminated from consideration. This leaves two rows or rules in the illustrated example. Since questions B, D and E are "don't care" or "not relevant" (?) and the answer to Question A is already known, the remaining questions 461 that require answers based on the current runtime data 442 include Questions C and G. Thus, the rule engine 412 uses the decision table 460 to select one or more rules 461 and determine or select a candidate question 462 that remains unanswered in view of the current runtime or instance data 442.

The logic agent 410 provides a non-binding suggestion 411 comprising a selected question 461 or topic to be addressed to the UI controller 430, which includes a UI or user experience manager 431 that determines how to process selected questions 461 or topics and generates an interview screen 432 for the UI or selects an interview screen 432 of the UI based on the question 461 or topic of the non-binding suggestion 411. For ease of explanation, reference is made generally to a UI controller 430. For this purpose, the UI management module may include a suggestion resolution element, a generator element, and an interview screen management element or flow/view management" module as described in U.S. application Ser. No. 14/206,834, previously incorporated herein by reference, the suggestion resolution element is responsible for resolving the strategy of how to respond to incoming non-binding suggestions 441 provided by the logic agent, and for this purpose, the suggestion resolution element 341 may be programmed or configured or controlled by configuration files 433 that specify whether, when and/or how non-binding suggestions 411 are processed (e.g., priority, sequence, timing, in a current, next or subsequent interview screen, random, never or ignore, not until additional data received. For example, a configuration file 433 may specify one or more or all of how to process the non-binding suggestion 411 based on whether to consider or ignore the non-binding suggestion 411, when the non-binding suggestion 411 should be processed, content of an interview screen 432 based on the non-binding suggestion 411, how to present content or interview screens 432 based on the non-binding suggestion 411 in view of a form factor or type of a computing device utilized by the user of the tax preparation application or that executes the tax return preparation application embodying system components described above with reference to FIGS. 3-7, which non-binding suggestion(s) 411 have priority over others or a sequence of non-binding suggestions 411, which configuration files 433 have priority over others or a sequence of configuration files 433 in the event that multiple configuration files 433 may potentially be used for purposes of configuration conflict resolution. For example, a configuration file 433 may specify that a non-binding suggestion 411 should be processed or addressed immediately or on the spot, next, at a later time, after certain or other additional tax return data has been received, or at the end of the process. Configuration files 433 may also specify whether non-binding suggestions 411 should be processed individually or aggregated for processing as a group with resolution of any priority issues. As another example, a configuration file 433 may specify that content should be adjusted or whether or how non-binding suggestions 411 should be processed in view of a screen size or dimension of a type of computing device that executes the tax preparation application since questions or more content may be more suitable for computing devices such as laptop and desktop computers, which have larger screens than smaller mobile communication devices such as smartphones.

The UI controller 430 generates the resulting user interaction or experience or creates or prepares an interview screen 432 or content thereof based on a library of visual assets such as pre-programmed interview screens or interview screens that are templates and that can be populated by the UI controller with a question 461 or topic of a non-binding suggestion 411.

The tax calculation engine 480 reads the current runtime or instance data 442 from the shared data store 440, and uses this data as inputs into respective nodes of one or more calculation graphs 482, and respective results or values are calculated with associated functions that are executed with the input data. New or resulting data is written back by the tax calculation engine 480 to the shared data store 440 for subsequent reading by the logic agent 410. For example, if the runtime or instance data 442 received thus far includes wages and interest earned from two savings accounts, a function for calculating Adjusted Gross Income (AGI) would sum this wage and interest data, and the resulting AGI value (based on the runtime data received thus far) is written back to the shared data store. As other types of AGI data are received or imported, the tax calculation engine 480 will run the calculation graphs 482 again to calculate a new AGI value, which would then be stored to the data store 482.

Additionally, according to embodiments, a question modification module or question personalization module 420 (generally, modification module) is a modular component that is positioned between the logic agent 410 and the UI controller 430 for purposes of modifying or twisting questions 461 that are the subject of a non-binding suggestion 411 directed to the UI controller 430. In the illustrated embodiment, the modification module 420 is in communication with the logic agent 410 and the UI controller 430, and may also be in communication with the shared data store 440. In certain embodiments, the modification module 420 receives data about the user from the logic agent 410, and in other embodiments, the modification module 420 reads the current runtime or instance data 442 to determine data about the user. Having described aspects of system components and how they work together, further details regarding the question modification module 420 are described with reference to FIGS. 8-21.

Figure 8:
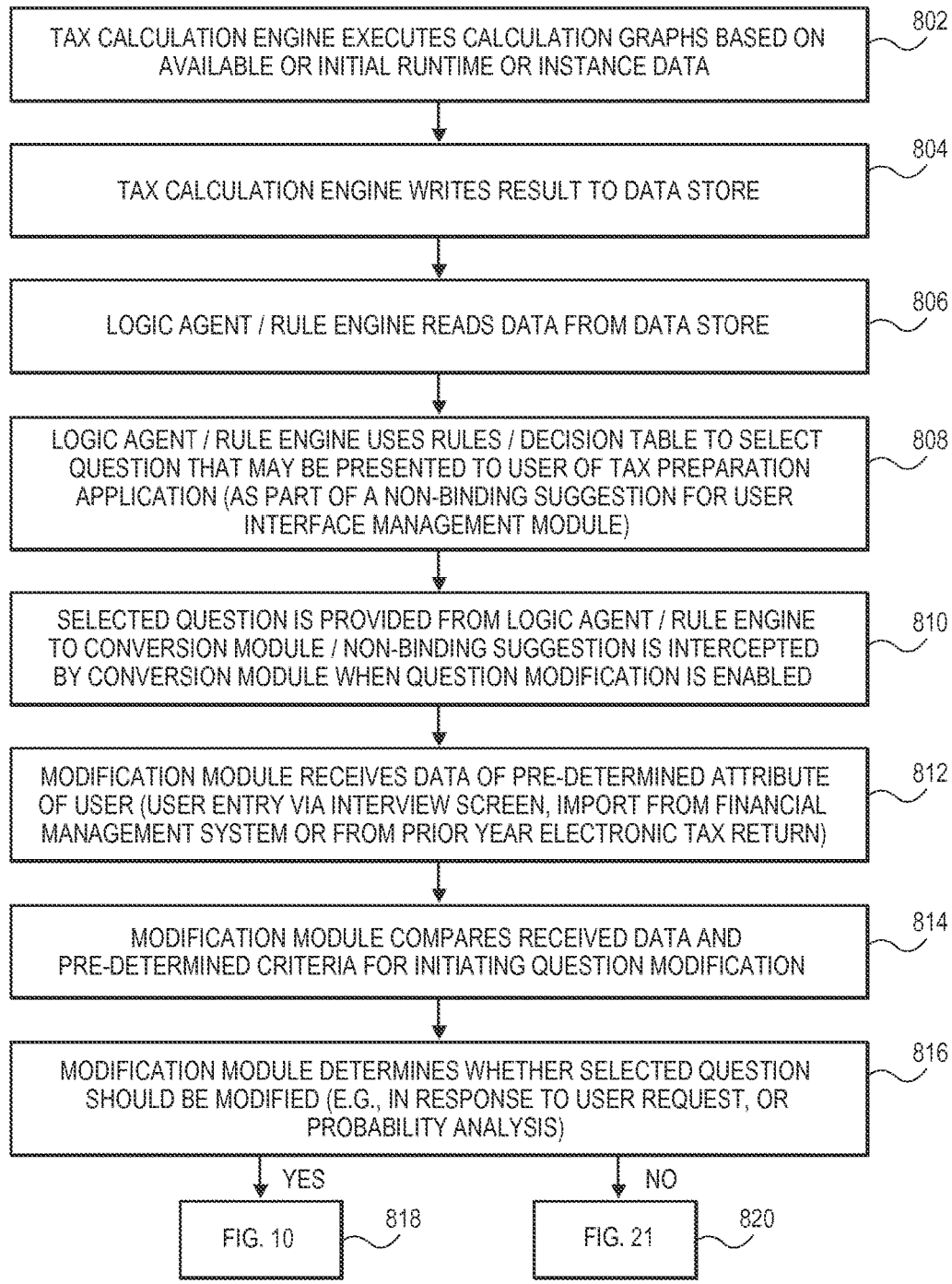
FIG. 8 is a flow diagram illustrating processing of data of a shared data store to determine whether to modify a question according to embodiments.

Referring to FIG. 8, in a computer-implemented method according to one embodiment, at 802, the tax calculation engine 480 may execute calculation graphs 482 based on available or initial runtime or instance data 442. At this point, there may be no data or some data entered or imported into the data store 440 as described above. At 804, the tax calculation engine 480 writes any results or updates to the data store 440. At 806, the logic agent 410 reads the current runtime or instance data 442 from the data store 440, and at 808, may use rules 461, such as those specified by the decision table 460 as described with reference to FIGS. 4-7, to select one or more questions 462. As described above, these questions 462 may be the subject of or included within one or more non-binding suggestions 411. At 810, the selected question 462 or non-binding suggestion 411 comprising a question 462 is output by the logic agent 410, and in the illustrated embodiment, received or intercepted by the question modification module 420 at 812 (when question modification module 420 is enabled, such as in response to a user request, or in response to receiving or determining certain runtime or instance data 442 about a pre-determined user attribute, which triggers question modification according to embodiments.

For example, at 814, the question modification module 420 receives runtime or instance data 442 of a selected or pre-determined attribute of the user. This data 442 may be received from the logic agent 410 (as the logic agent 410 read current runtime data 442 from the data store 440 in connection with use of rules 461 to select a question 462), or received or read independently of the logic agent 410 by accessing the shared data store 440 directly. In either case, the question modification module 420 compares received data 442 of a selected or pre-determined attribute of the user and pre-determined criteria for determining whether to initiate question modification based on the question 462 or non-binding suggestion 411 received from the logic agent 410.

For example, the attribute of the user may be demographic data such as the user's age, state of residence, income level, occupation, etc. The attribute may also be not of the user but related to the user such as the type of computing device that executes the tax return preparation application including components of system embodiments and utilized by the user to prepare an electronic tax return—whether a laptop or desktop computer, a tablet computing device, or a mobile communication device such as a smartphone. At 816, the question modification module 420 determines whether the question 461 that was selected or identified by the logic agent 410 should be modified.

According to one embodiment, step 816 involves comparing the data of the pre-determined attribute and pre-determined criteria to determine whether to modify the question 416. According to one embodiment, the demographic data of the user is analyzed. For example, if the user is younger than a pre-determined age, then question modification is executed, but if not, then question modification is not executed. As another example, the pre-determined attribute involves a type of computing device utilized to prepare the electronic tax return. For example, question modification is executed if the user is using a smartphone or tablet, but not if the user is using a laptop or desktop computer.

For this purpose, referring to FIG. 9, the question modification module 420 may access a table 900 that may include columns 901 and rows 902 including data linking the pre-determined user attribute, the data thereof, a first or original question 461, data indicating whether to modify an original question and/or which original questions or types or categories of original questions to modify, and for given data of an attribute, the table 900 may also recite the modified question 461*m* ("m" indicating "modified" question) that is to be used. FIG. 9 provides an example involving pre-determined attribute data is "occupation" and the user being a student, and the table 900 indicating a first or original question 416 of "Are you older than 65" (which is specified by the decision table 460 and associated schema 446) and a second or modified question 416*m* of "You are younger than 65, right?"

According to another embodiment, a determination of whether to execute question modification involves a probability that a user's response to a first, original or unmodified question 461 will be a positive response and/or a probability that a response to a second or modified question 461*m* will be a positive response. For example, the table 900 or other data structure may include statistical data mined from other electronic tax returns such as prior year returns of the user and/or other taxpayers to determine that for certain attribute data of the user, the user is more likely to answer "yes" to certain questions, but more likely to answer "no" to other questions. Thus, questions to which the user is determined to more likely answer "no" may be questions that are modified according to embodiments in order to encourage positive responses and positive impressions and user feedback.

Continuing with the above example involving pre-determined attribute data is "occupation" and the user being a student, statistical data may show that the average age of "student" is 22, such that it is more likely (e.g., 85%) that the user is younger than 65, such that the table 900 would indicate a first or original question of "Are you older than 65" based on the decision table 460 and associated schema 446, whereas the second or modified question 461*m* of "You are younger than 65, right?" for a "student."

Figure 10:
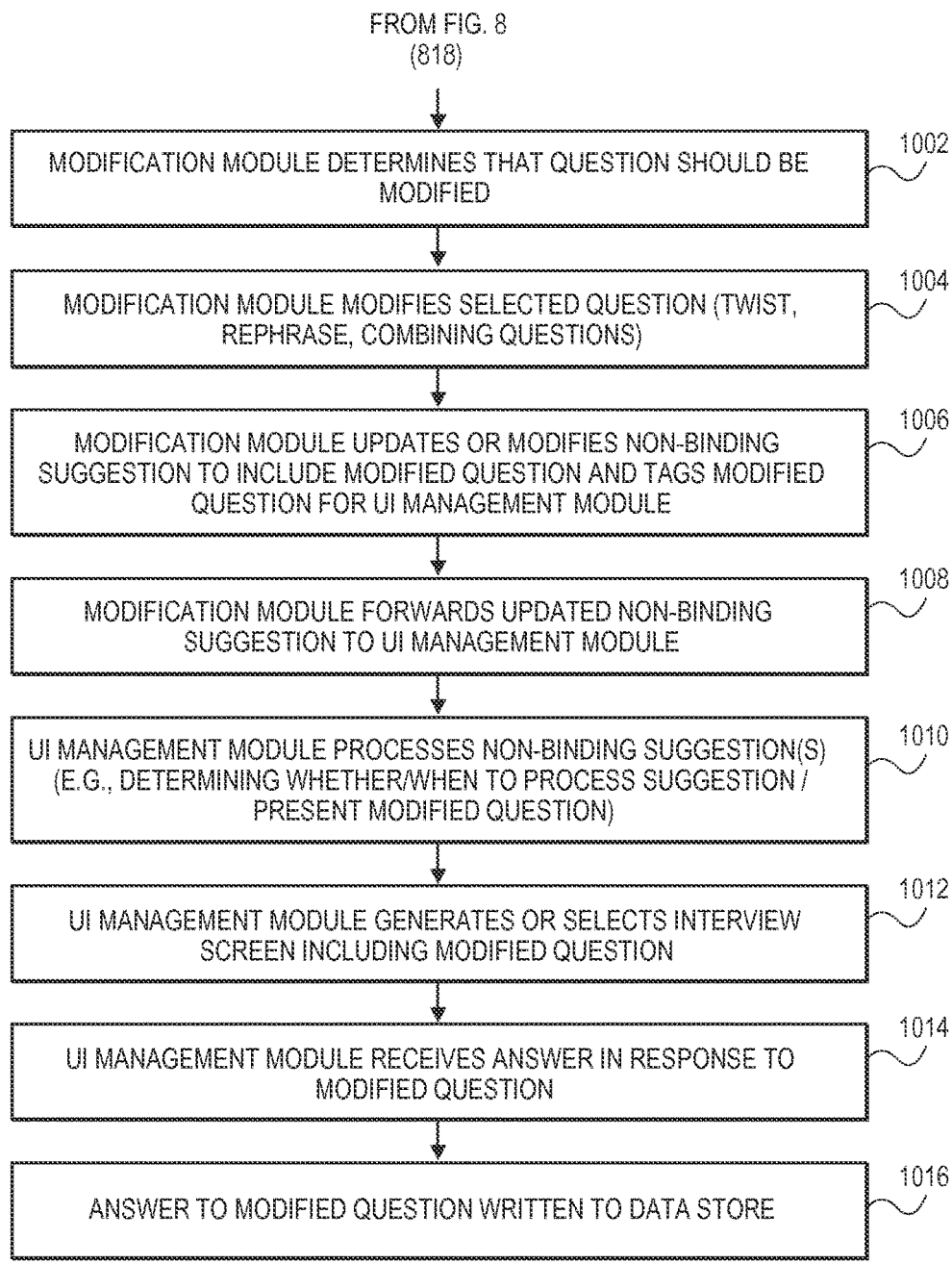
FIG. 10 is a flow diagram of one embodiment in which a determination is made to execute question modification.

Referring to FIGS. 10-11, the result of step 816 is a determination by the modification module 420 whether to initiate question modification for the question 416 or non-binding suggestion 411 received from the logic agent 410. If so, then the process continues to FIG. 10, and if not, the process continues to FIG. 11.

Referring to FIG. 10, at 1002, the modification module 420 determines that first or original question 416 should be modified and at 1004, modifies the question 416 according to embodiments.

According to one embodiment, question modification involves utilizing a second question 416*m* that is different than the first or original question 416 in that the second question 416*m* rewords or rephrases the first question 416, or has a different structure than the first question 416, while still involving the same tax topic or subject matter of the first question 416. In one embodiment, with reference again to FIG. 11, the first or original question 416 is specified by a column of the decision table 460 and is consistent with the data model or schema 446, whereas the second or modified question 416*m* is not.

For example, referring to FIG. 11, a first or original question 461 may be "Are you 65 or older?" According to one embodiment, the modification module 420 accesses a table 900, looks up runtime or instance data 442 of a pre-determined attribute of the user, and identifies the modified question 416*m* of "You are younger than 65, right?"

Thus, as shown in FIG. 11, the second question 416*m* not only rewords or rephrases the first question 416, by asking whether the user is "younger" 1110 than a certain age versus "older" 1100 than a certain age, but also uses a different structure since the first question 416 is a question structure 1102, and the second question 416*m* may be in the form of a question including an assumption and request for confirmation by the user. For example, FIG. 11 illustrates an example of how an original question 461 is restructured and reworded to be phrased as an assumption ("You are younger than 65") 1112*a* and a request for confirmation ("right?") 1112*c* of that assumption 1112*a*, in contrast to the first or original question 1102.

Further, the embodiment illustrated in FIG. 11 involves a semantic twisting 1130 aspects as a result of the question modification. In contrast to asking 65 or older as in the first question 461, the second or modified question 461*m* involves "younger than 65" 1112*b* instead. Referring to FIG. 12, a table 1200 constructed and utilized according to one embodiment includes columns 1201*a-d* for data including an answer to a first or original question 461, a meaning of that answer, an answer to a question 416*m* modified according to embodiments, and an answer to that question, and rows 1202*a-b* with respect answers and meanings. As shown in FIG. 12, a common answer (e.g., "Y") to both questions 461, 461*m* has different meanings. Specifically, answering "Y" to the first question 461 means that the user is 65 or older, whereas answering "Y" to the second or modified question 461*m* means the opposite, i.e., that the user is not 65 or older and instead is younger than 65. In contrast, referring to FIG. 13, answering "N" to the first question means that the user is younger than 65, whereas answering "Y" to the second question has the same or substantially similar meaning.

Figure 14:
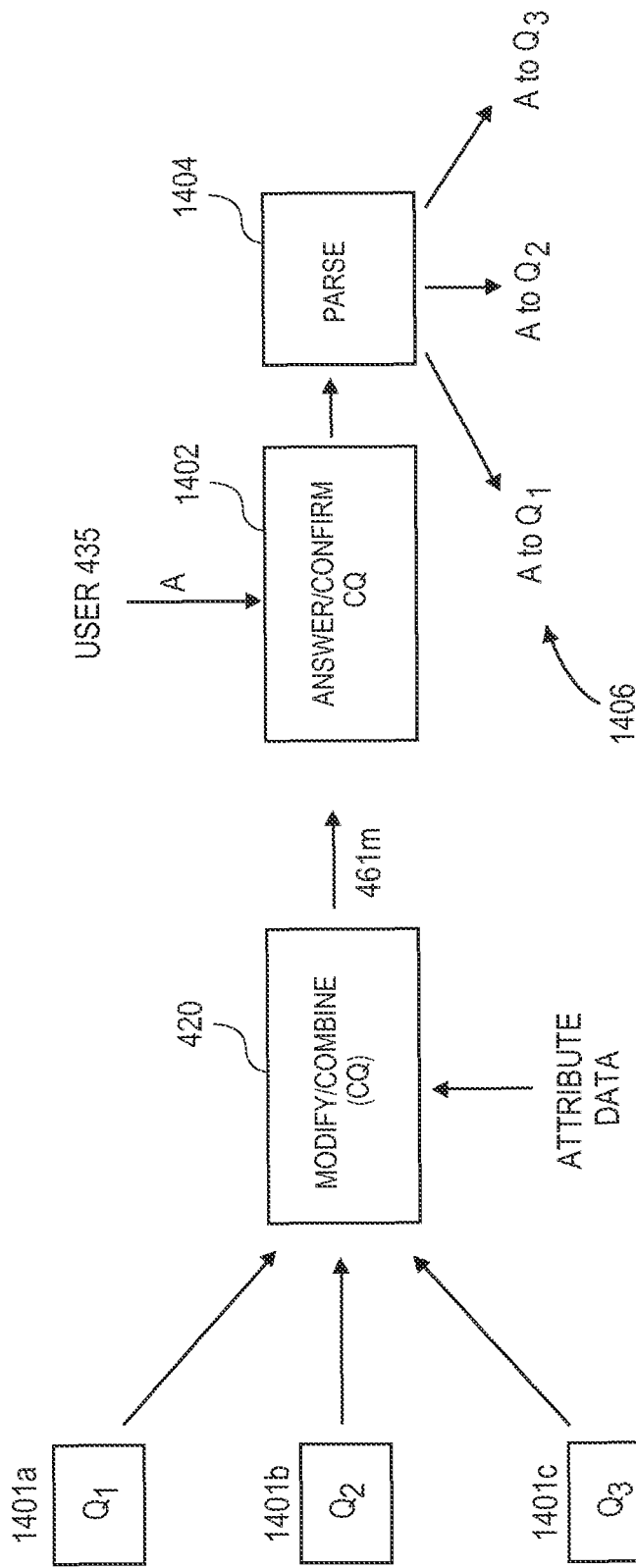
FIG. 14 illustrates one manner in which question modification may be performed by combining sub-questions or question elements into a single modified question.

Referring to FIGS. 14-15, another manner in which question modification may be executed is aggregating or combining multiple questions or sub-questions or question elements 1401*a-c*, into a single, second or modified question 461*m*, or a "combined question" (CQ). In the illustrated embodiment, the first or original question 461 addresses one tax-related topic (such as age, as in the example above), whereas the second or modified question 461*m* includes multiple sub-questions or question elements 1401 that addresses multiple tax-related topics (such as age, as well as marital status, sex). Thus, in the illustrated embodiment, the second or modified question 461*m* that includes multiple sub-questions or question elements addresses the same topic that is the subject of the first question, as well as at least one additional topic. As described in further detail below, when the user responds with an answer or confirms an assumption 1402, that same answer or confirmation can be applied to each of the questions or sub-questions or elements 1401*a-c* such that they can be parsed 1404 from the modified question 461*m* and the answer or confirmation applied thereto 1406.

Figure 16:
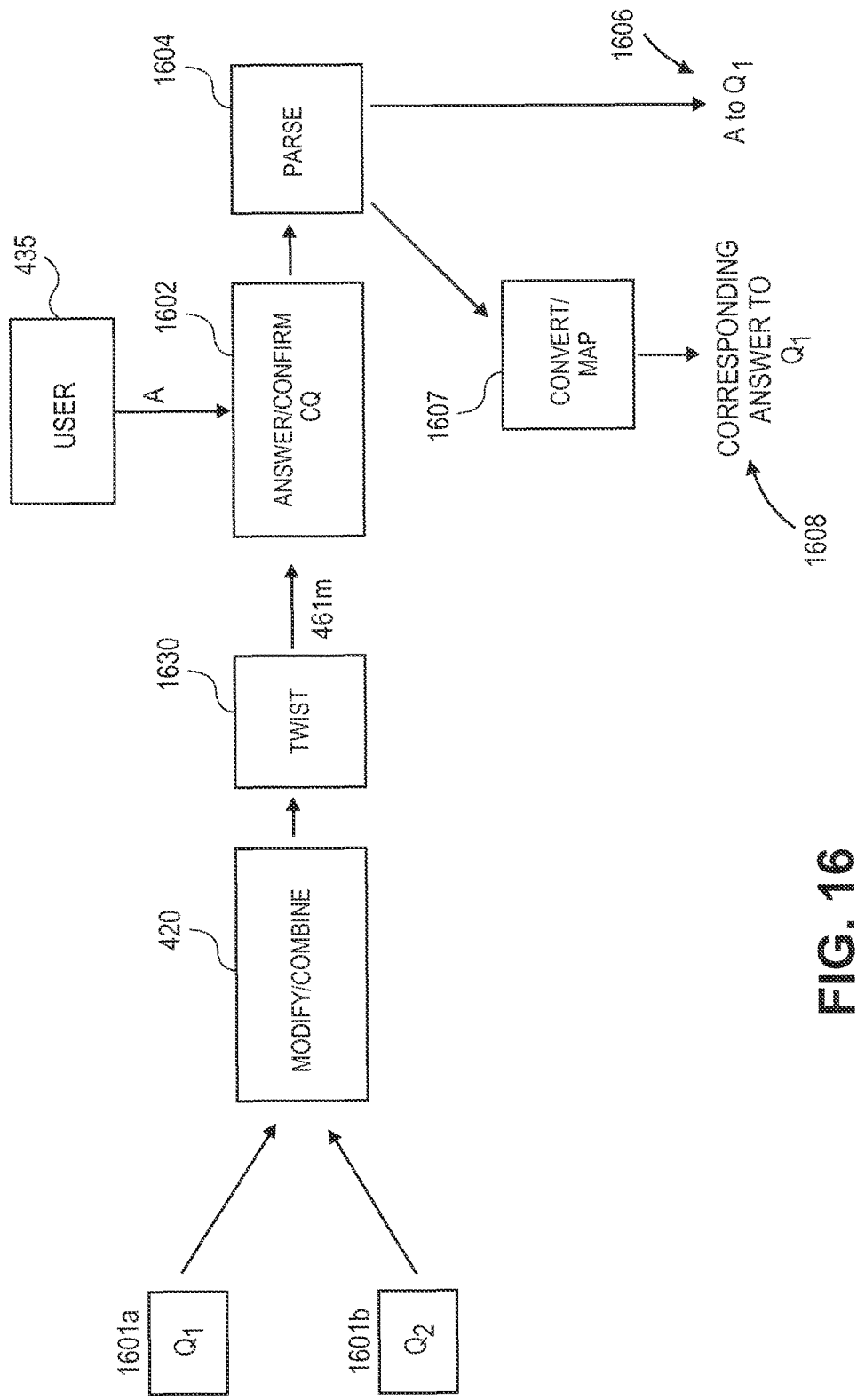
FIG. 16 illustrates one manner in which question modification may be performed by combining sub-questions or question elements into a single modified question such that at least one sub-question or question element involves twisting.
Figure 17:
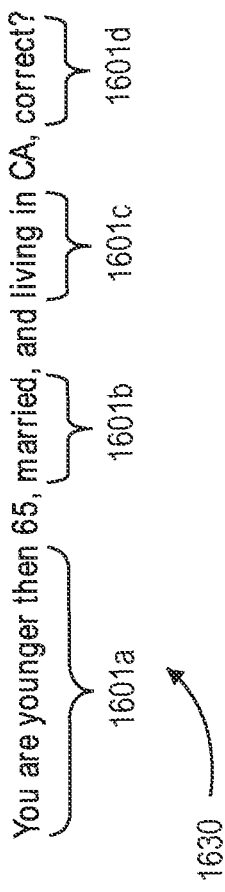
FIG. 17 illustrates an example of how question modification shown in FIG. 16 may be implemented.

Referring to FIGS. 16-17, according to another embodiment, embodiments described with reference to FIGS. 11-15 may be combined such that question modification may be executed by aggregating or combining multiple questions or sub-questions or question elements 1601*a-b*, into a single, second or modified question 461*m*, and at least one of those sub-questions or question elements 1601 is restructured or reworded and twisted 1630 (as described with reference to FIG. 11-13. FIG. 16 illustrates this process in further detail in which question elements 1601*a-b* are combined to form a second or modified question 461*m*, and one or more of those elements 1601 may involve or be twisted 1630 such that the modified question 461*m*, includes at least one twisted element 1601. Thus, in the illustrated embodiment, the first or original question 461 addresses one tax-related topic (age), and the second or modified question 461*m*-1 addresses multiple tax-related topics (age, marital status, sex) and includes at least one sub-question or element 1601 that restructured or twisted 1630.

For example, in the illustrated embodiment, the first or original question 461 addresses one tax-related topic (such as age, as in the example above), whereas the second or modified question 461m includes multiple sub-questions or question elements 1601a-d that addresses multiple tax-related topics (such as age, as well as marital status, sex), involve restructuring by being framed as an assumption requesting confirmation, and involves a twisting element 1601a/1630 compared to the original question since 1601a involves "younger" than 65 rather than "65 or older" as in the first or original question 461.

As described in further detail below, when the user responds with an answer or confirms an assumption 1602, that same answer or confirmation can be applied to each of the questions or sub-questions or elements that did not involve a twist 1630 such that when the sub-questions or elements are parsed 1604, the answer or confirmation 1602 is applied 1606 to that question (e.g., Q1), but for the other question Q2, an additional processing step to convert or map 1607 the answer or confirmation 1602 into an answer or confirmation corresponding to the original untwisted question or element, and then that corresponding answer is applied to that question or element 1608.

Referring again to FIG. 10, after question modification has been executed, at 1006, the question modification module 420 updates or modifies non-binding suggestion 411m ("m" referring to "modified' non-binding suggestion) to include the second or modified question 461m (whether that second or modified question 461m involves a restructure or twist, combination, or both restructure or twist and combination as discussed above), and may also tag or otherwise indicate the non-binding suggestion 411m or modified question 461m that is the subject thereof involves a modification for the UI controller 430 so that the UI controller knows that the question that is presented was not the original question selected by the logic agent 110. At 1008, the modified non-binding suggestion 411m including the second or modified question 461m is sent by the question modification module 420 to the UI controller 430, and at 1010, the UI controller 430 processes non-binding suggestion(s) (e.g., determining whether/when to process suggestion/present modified question, the order, priority, etc., as described above and in U.S. application Ser. No. 14/206,834, previously incorporated herein by reference. At 1012, when the UI controller 430 decides to present the second or modified question 461m to the user, the UI controller 430 generates or selects interview screen 432 including modified question 461m, which is then presented to the user, and at 1014, the user responds with an answer to the second or modified question 461m. Thus, the user answers 436m the second or modified question 461m, rather than the first question 461 that was originally selected by the logic agent 410.

Figure 18:
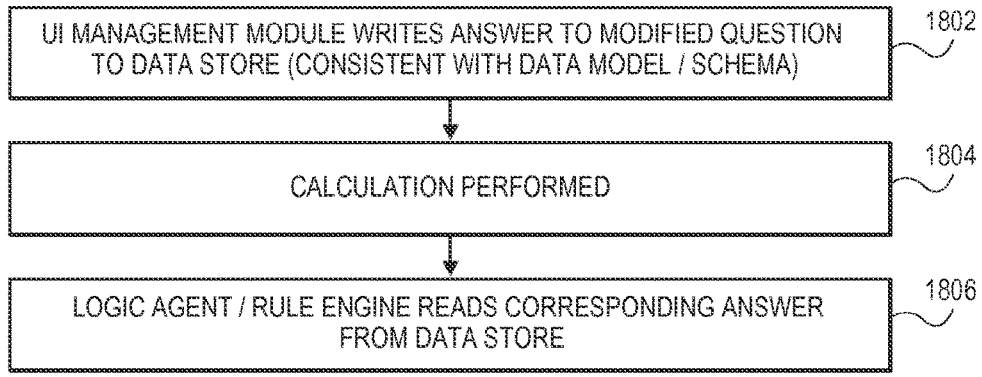
FIG. 18 is a flow diagram of one embodiment in which a user interface management module presents a modified question to a user, and the user's answer is stored by the user interface management module to the shared data store.
Figure 19:
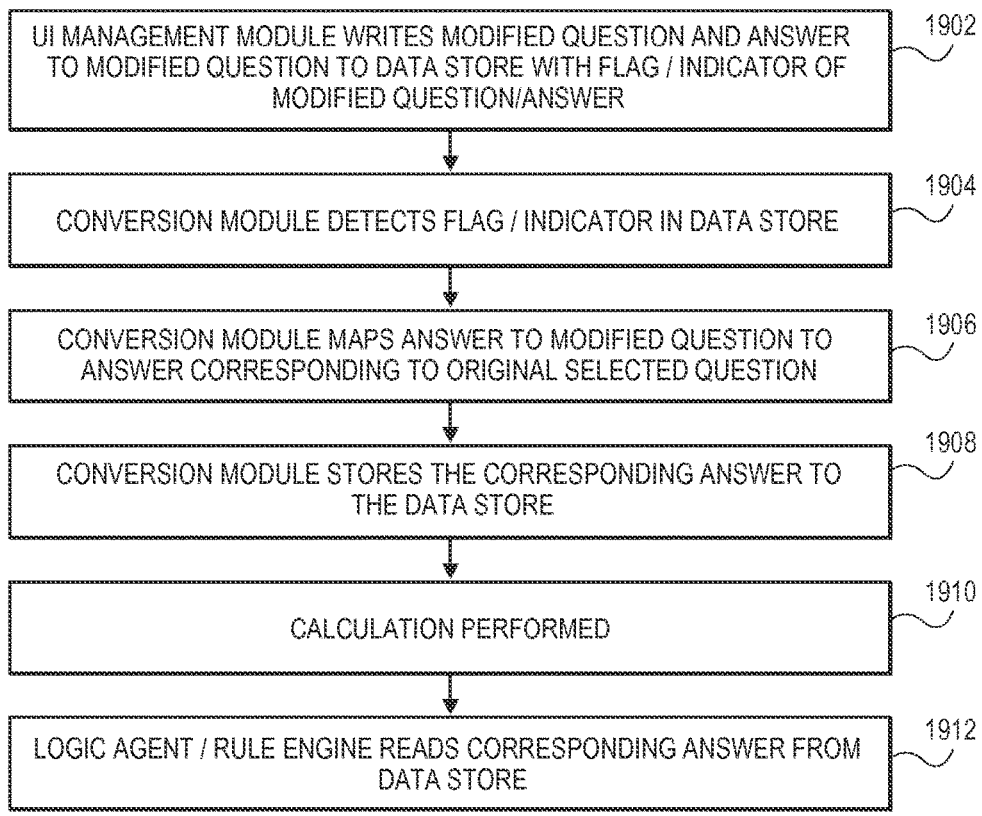
FIG. 19 is a flow diagram of one embodiment in which a user interface management module presents a modified question to a user, and the user's answer is stored by the user interface management module to the shared data store and writes a flag associated with the answer to identify the answer as an answer to a modified question so that a conversion module may identify the flag and process the answer.
Figure 20:
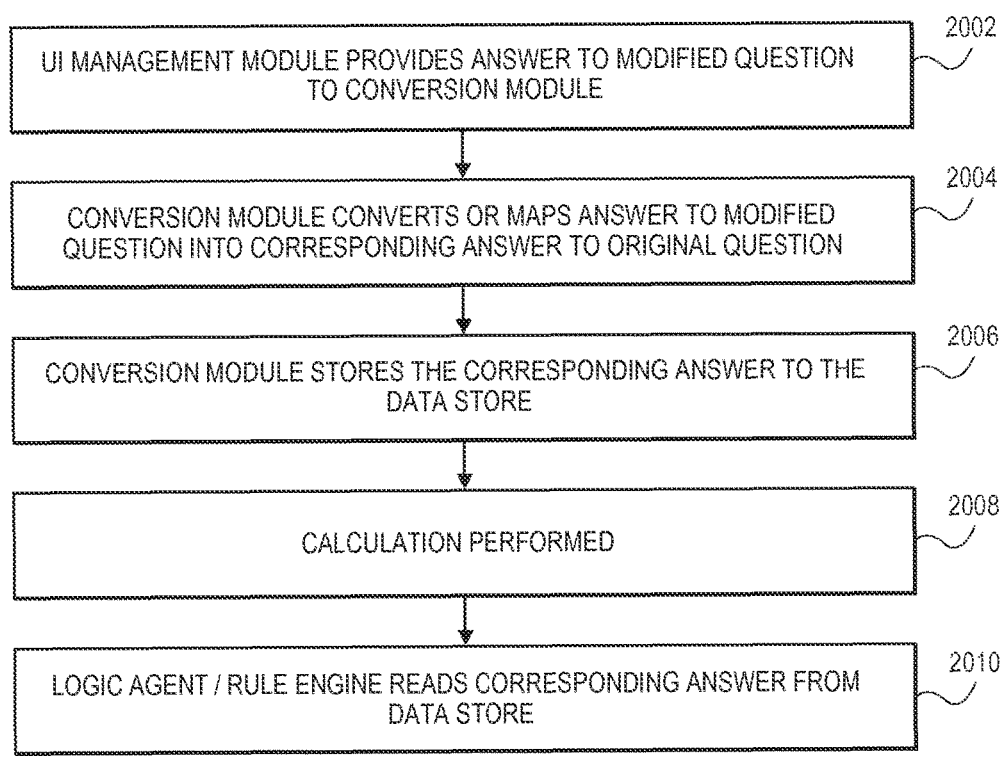
FIG. 20 is a flow diagram of one embodiment in which a user interface management module presents a modified question to a user, and the user's answer is provided by the user interface management module to a conversion module, which processes the answer and writes a result to the shared data store.
Figure 21:
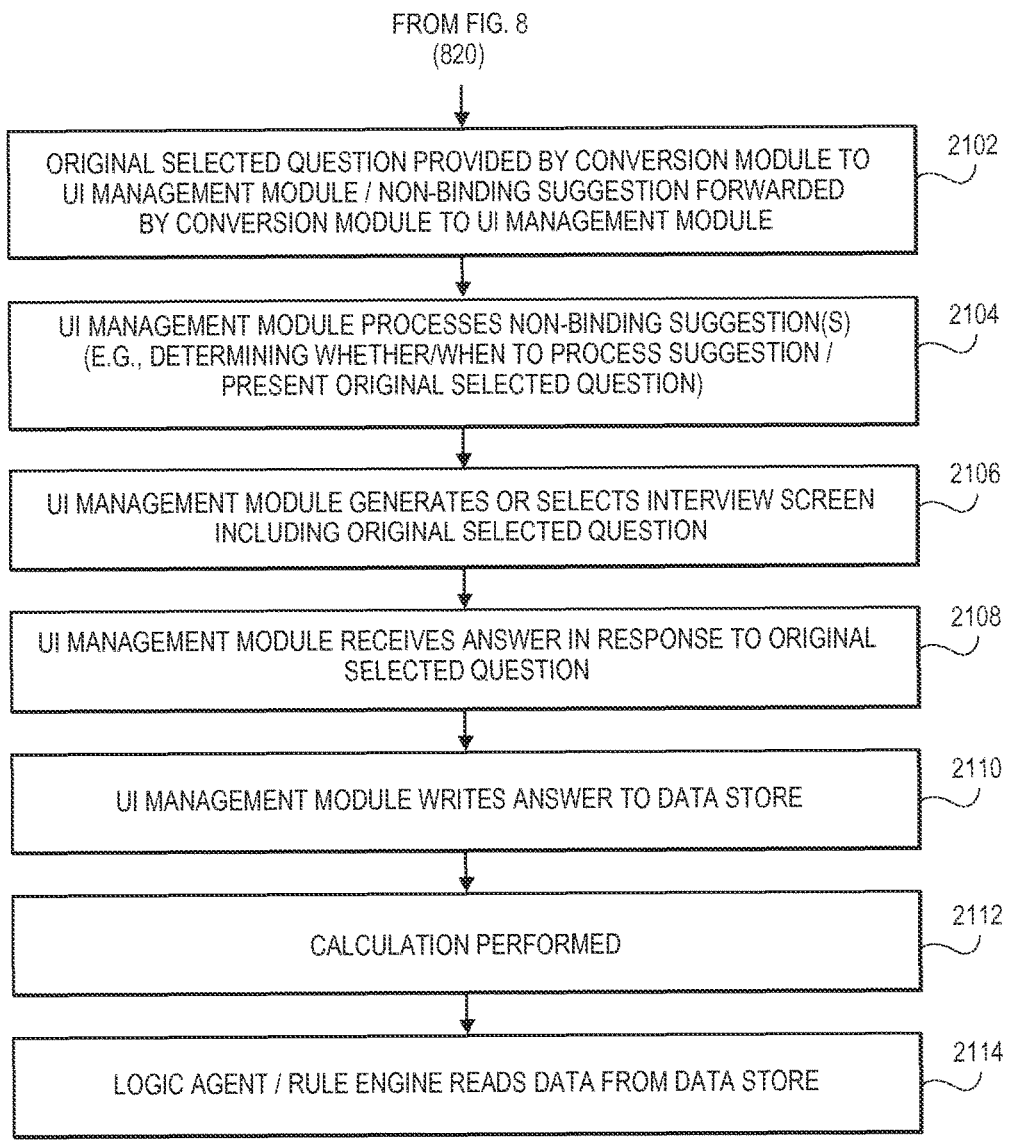
FIG. 21 is a flow diagram illustrating processing according to one embodiment when it is determined not to execute question modification.

At 1016, and with further reference to FIGS. 18-20, the answer 436m to the second or modified question 461m written to data store 440 by the UI controller 430 or by the modification module 420.

Referring to FIG. 18, in one embodiment, at 1802, the UI controller 430 writes the received answer 436m to modified question 416m to data store 440. In embodiments in which the second question 461m and answer 436m are consistent with or specified by the data model or schema 446 (such as a modified question 461m involving combining question elements that are all consistent with the data model or schema 446), then answer conversion or "untwisting" of the answer 435m is not necessary, such that at 1804, the tax calculation engine 480 can proceed to read the resulting updated runtime or instance data 442 to perform calculations and write back results to the shared data store 440, and at 1806, the logic agent 410 or rule engine 412 reads updated runtime or instance data 442 from the shared data store 440 and utilizes the 461 rules to determine again which questions 462 or topics can be the subject of the next round of non-binding suggestions 411 for the UI controller 430.

For example, referring again to FIG. 14, when a user responds to a modified question 461m including multiple sub-questions or question elements 1401, each of which is consistent with or based on the underlying data model or schema 446, then the answer provided by the user can be used for each of the sub-questions or question elements 1401. Thus, the modified question 461m can be parsed 1410 to determine the individual sub-questions or question elements 1401, and the user's answer can be applied to each of those and stored 1420 to the shared data store 440 per the data model or schema 446.

Referring to FIGS. 19-20, if a second or modified question 461m involves a semantic "twist" such that the resulting answer 435m to such a question also involves a semantic "twist" (e.g., as described above with reference to FIGS. 11-13), then it may be necessary to perform additional conversions or mapping to "untwist" the answer 435m to the second or modified question 461m to determine or derive an answer 435d ("d" referring to "determined" or "derived") corresponding to the first or original question 461

For example, referring again to FIG. 16, when a user responds to a modified question 461m including multiple sub-questions or question elements 1401, at least one of which is "twisted" and is not consistent with or based on the underlying data model or schema 446, then the answer provided by the user can be used for one of the sub-questions or question elements 1401, but not both. Thus, the modified question 461m can be parsed 1410 to determine the individual sub-questions or question elements 1401, the answer to the "twisted' question can be converted or mapped to determine a corresponding answer to a first original question, and then the user's answer (without conversion or mapping) and the corresponding answer (determined by conversion or mapping) can be applied to stored 1420 to the shared data store 440 per the data model or schema 446.

Referring to FIG. 19, in one embodiment, at 1902, the UI controller 430 writes the answer 435m to the second question 461m to the shared data store 440, and may also write the second question 461m to the shared data store 440. When doing so, the UI controller 430 may flag the answer 435m and/or second question 461m to indicate that the answer 435m is for the second or modified question 461m, not the first or original question 461. At 1904, the modification module 420, or a separate conversion module 492 in communication with the modification module 420 or hosted by the data store 440 (as shown in FIG. 4), detects the flag/indicator, e.g., as a result of a periodic read of the data store runtime or instance data 442, or by a notification sent by the UI controller 430 to the modification module 420 that the UI controller 430 has written an answer 435m to the shared data store 440. At 1906, the modification module 420 (or conversion module 492 thereof or in communication therewith) converts or maps the answer 435m to a different answer 435d corresponding to or consistent with an associated answer to the first or original selected question 461. For this purpose, the table utilized by the modification module 420 may also include the mapping information such as mapping between columns of tables shown in FIGS. 11-12, or by use of a separate mapping resource or other data structure, to determine a corresponding answer 435d to the first question 461. At 1908, the modification module 420 writes the derived corresponding answer 435*d* back to the shared data store 440 to update the runtime or instance data 442, and at 1910-1912, the tax calculation engine 480 proceeds to read the updated runtime or instance data 442 to perform calculations and write back results to the shared data store 440, and the logic agent 410 or rule engine 412 reads updated runtime or instance data 442 from the shared data store 440 and utilizes the rules 461 of the decision table 460 to determine the next round of questions 461 or topics that can the subject of the next non-binding suggestions 411 for the UI controller 430.

Referring to FIG. 20, in another embodiment, rather than the UI controller 430 writing the received answer 435*m* to the second or modified question 461*m* to the shared data store 440, and the modification or conversion module 420/492 reading the answer 435*m* from the data store 440 for processing and mapping, the UI controller 430 instead returns the answer 435*m* to the second question 461*m* to the modification module 420 at 2002, and 2004, the modification module 420 (or conversion module 492 thereof or in communication therewith) converts or maps the answer 435*m* to modified question 461*m* to determine or derive a corresponding answer 435*d* to first, original question 461 thus "untwisting" the received answer 435*m* before the answer 435*m* is stored to the share data store 440. At 2006, the modification module 420 stores the corresponding answer 435*d* to the shared data store 440, and at 2008-2010, the tax calculation engine 480 can proceed to read the updated runtime or instance data 442 to perform calculations and write back results to the shared data store 440, and the logic agent 410 or rule engine 412 reads updated runtime or instance data 442 from the shared data store 440 and utilizes the rules 461 of the decision table 460 to determine which questions 461 can be selected as the subject of the next iteration of non-binding suggestions 411 for the UI controller 430.

Thus, depending on the type of modification employed, the answer 435*m* to a modified question 461*m* can be processed and stored to the data store 440 in different ways such that "untwisting" or mapping the answer 435*m* to determine or derive a corresponding answer 435*d* may or may not be required, but eventually the answer 435*d* is determined or derived and stored to the shared data store 440 in a manner that is consistent with or specified by the data model or schema 446 even if the modified question 461*m* or answer 435*m* thereto is not consistent with or specified by the data model or schema 446.

Referring to FIG. 21, and referring again to FIG. 8 (step 820), when the modification module 420 determines that a selected question 461 received from the logic agent 410 should not be modified (e.g., because a user request has not been received, the pre-determined attribute data does not satisfy pre-determined criteria, or the probability analysis indicates that modification is not needed), then the modification module 420 is paused or deactivated, or otherwise made transparent to passes the non-binding suggestion through to the UI controller 430 without any question 461 or non-binding suggestion 411 modification, and the processing involving the logic agent 110, UI controller 430, shared data store 440 and tax calculation engine 480 continue in the absence of question modification. Thus, at 2102, the original selected question 461 that is consistent with or specified by the data model or schema 446 and part of a non-binding suggestion 411 generated by the logic agent 410 is forwarded to UI controller 430, and at 2104, the UI controller 430 processes non-binding suggestion(s) 411 (e.g., determining whether/when to process suggestion/present original selected question). At 2106, the UI controller 430 generates or selects interview screen 432 including original selected question, and at 2108, receives answer 436 in response to original selected question 461, and at 2110, writes the answer 436 to the shared data store 440. At 2112-2114, the tax calculation engine 480 proceeds to read the updated runtime or instance data 446 to perform calculations and write back results to the shared data store 440, and the logic agent 410 or rule engine 412 reads updated runtime or instance data 446 from the shared data store 440 and utilizes the rules 461 of the decision table 460 to determine which questions 462 can be the subject of the next iteration or round of non-binding suggestions 411 for the UI controller 430, and when the next questions 462 are selected, they are analyzed by the modification module 420 as discussed above.

When the electronic tax return is populated and completed by the logic agent 410 or by the direction of the logic agent 410 or using one or more components or services 470 as applicable, the electronic tax return can be printed and/or filed with a tax authority such federal state or local tax authority or other tax collecting entity such as Internal Revenue Service and Franchise Tax Board of the State of California.

Figure 22:
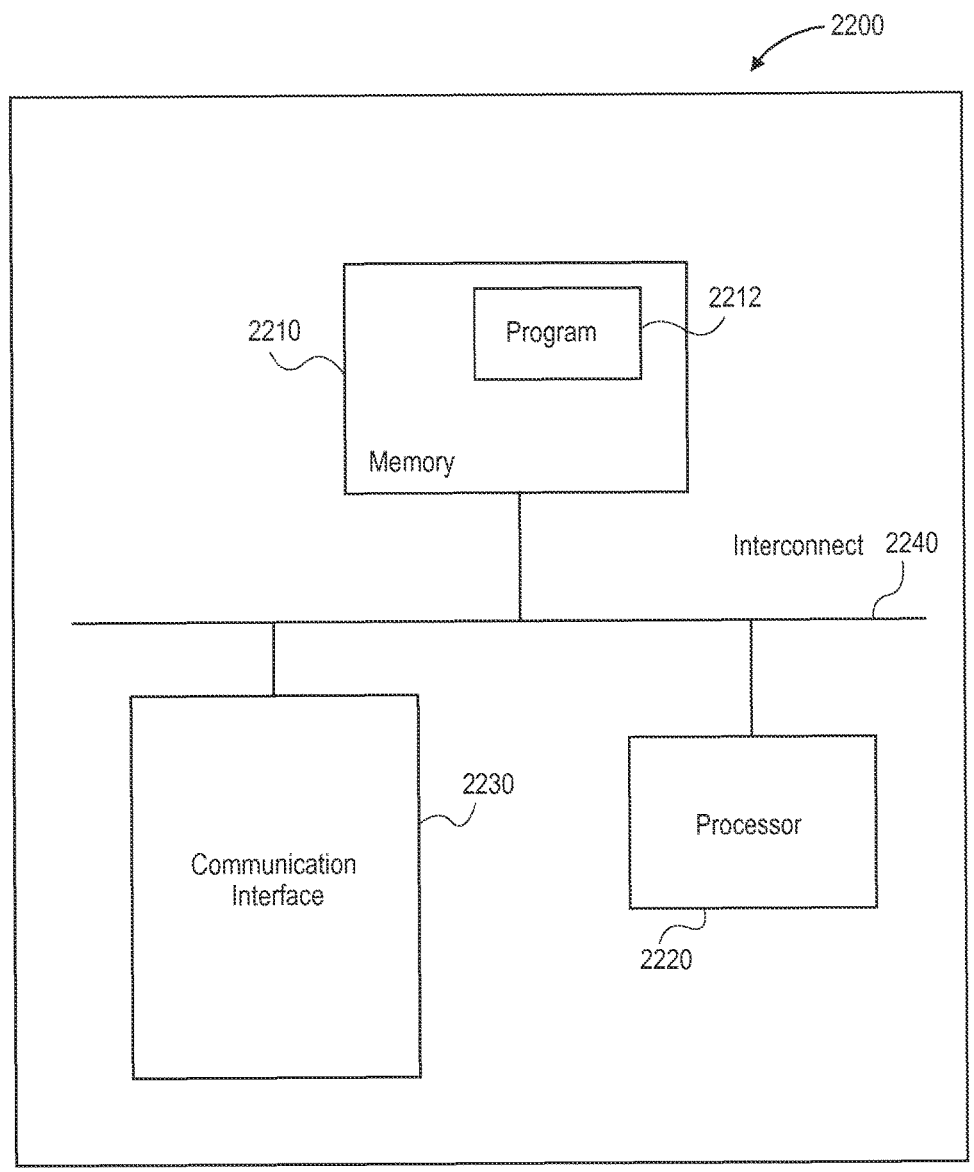
FIG. 22 is a block diagram of components of a system constructed according to another embodiment for performing semantic dependency resolution.

FIG. 22 generally illustrates certain components of a computing device 2200 that may be utilized to execute or that may embody components of embodiments. For example, the computing device may include a memory 2210, program instructions 2212, a processor or controller 2220 to execute instructions 2212, a network or communications interface 2230, e.g., for communications with a network or interconnect 2240 between such components. The memory 2210 may be or include one or more of cache, RAM, ROM, SRAM, DRAM, RDRAM, EEPROM and other types of volatile or non-volatile memory capable of storing data. The processor unit 2220 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 2240 may include a system bus, LDT, PCI, ISA, or other types of buses, and the communications or network interface may, for example, be an Ethernet interface, a Frame Relay interface, or other interface. The network interface 2230 may be configured to enable a system component to communicate with other system components across a network which may be a wireless or various other networks. It should be noted that one or more components of computing device 2200 may be located remotely and accessed via a network. Accordingly, the system configuration provided in FIG. 22 is provided to generally illustrate how embodiments may be configured and implemented.

Method embodiments or certain steps thereof, some of which may be loaded on certain system components, computers or servers, and others of which may be loaded and executed on other system components, computers or servers, may also be embodied in, or readable from, a non-transitory, tangible medium or computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 2220 performs steps or executes program instructions 2212 within memory 2210 and/or embodied on the carrier to implement method embodiments.

Although particular embodiments have been shown and described, it should be understood that the above discussion is not intended to limit the scope of these embodiments. While embodiments and variations of the many aspects of the invention have been disclosed and described herein, such disclosure is provided for purposes of explanation and illustration only. Thus, various changes and modifications may be made without departing from the scope of the claims.

For example, while certain embodiments of question modification are described with reference to aggregating or combining sub-questions or question elements, embodiments may also modify a question by splitting a question into multiple sub-questions or elements. For example, the logic agent may generate a non-binding suggestion for the UI controller that includes a question concerning an address including "Address Line 1", "Address Line 2", "City", "State", "Zipcode" and etc. The modification module may split "Address Line 1" into multiple elements such as "Street Name" and "Apartment Number", in which case a user would separately respond to these questions with different answers (e.g., "East Street" and "Apartment 10" such that the a joining operation may then be performed when storing these different answers back to the data store.

As another example, while certain embodiments are describe with reference to discrete boundaries (e.g., age 65 or older vs. younger than 65), the modification module may process multiple-to-one mapping. For example, the rules may require an answer to a question that involves a range or descriptive range (e.g., "Young," "Middle Aged" or "Senior") associated with ranges of numerical ages, in which case the modification module may modify the original question involving selection of "Young" "Middle Aged" and "Senior" options into a question specifying a range of ages, e.g., 1-18 years old, 19-61 years old, 62+ years old. Similarly, question modification may involve modifying a question asking for a range of ages into a question that asks the user to select a category, and then the answer comprising the selected category is subsequently untwisted into an associated age range. Thus, the "twist" and subsequent "untwisting" may involve conversion to or from descriptions to numerical data or ranges of numerical data.

Further, embodiments may involve storing only the post conversion or result of "untwisting" to the data store such that all of the data stored in the data store is consistent with or specified by the data model or schema, or other data such as the modified question and/or answer thereto can be stored to the data store and associated with the first question and corresponding answer, but the logic agent would only process the data that is consistent with or specified by the data model or schema when using the decision table rules to identify questions for the UI controller.

Moreover, while certain embodiments are described with reference to a modification module, or conversion module for "untwisting" answers as module components that operate independently of the logic agent, UI controller and data store, other embodiments may involve a modification module being a component of a logic agent or a component of a UI controller. Further, for purposes of "untwisting" or mapping an answer to a modified question to a corresponding answer to an original question, the modification module may embody these conversion capabilities, or a conversion module may be hosted by the data store to handle untwisting or mapping of answers to modified questions received from the UI controller.

What is claimed is:

1. A computer-implemented method for personalizing a user interface generated by a computerized tax return preparation application during preparation of an electronic tax return, the method being performed by a computer a processor executing computer-executable instructions of the computerized tax return preparation application stored in a data store accessed by the computer and comprising:

the computer, by execution of a modular rule-based logic agent of the computerized tax return preparation application, reading runtime data of the electronic tax return from a shared data store and selecting a first question to be included in a non-binding suggestion, the first question being selected by the modular rule-based logic agent based on a data structure comprising a decision table including a plurality of rows defining respective rules and a plurality of columns defining respective questions and which rules remain after elimination of at least one rule based on the runtime data;

the computer, by execution of a modification module of the computerized tax return preparation application that is in communication with the modular rule-based logic agent and a modular user interface controller, receiving the non-binding suggestion including the selected first question, determining data of a pre-determined attribute of the user based at least in part upon the runtime data of the electronic tax return, and modifying the non-binding suggestion by rephrasing the first question to a second question different from the first question based at least in part upon the pre-determined attribute data and the first question;

the computer, by execution of a modular user interface controller in communication with the modification module, generating an interview screen comprising the second question, presenting the interview screen to the user through a display of the computer such that the second question but not the first question is presented to the user, receiving an answer to the second question through the interview screen, and writing the answer to the second question to the shared data store, and flagging the answer to the second question in the shared data store;

the computer, by execution of a conversion module of the shared data store, detecting the flagged answer to the second question, and determining an answer to the first question that was not presented to the user based at least in part upon the answer to the second question that was presented to the user, wherein the answer to the first question is stored to the shared data store to update the runtime data.

2. The method of claim 1, further comprising the computer, by the modular user interface controller, flagging the answer to the second question in the shared data store to indicate that the answer to the second question is not an answer to the first question that was the basis of the non-binding suggestion.

3. The method of claim 1, further comprising the computer, by the modular user interface controller, storing the second question to the shared data store, wherein the second question and the answer to the second question are associated with each other in the shared data store.

4. The method of claim 1, further comprising the computer, by the modification module: converting the answer to the second question that was presented to the user into an answer to the first question that was not presented to the user, wherein the answer to the first question and the answer to the second question are different from each other.

5. The method of claim 4, wherein the first question that was not presented to the user, the answer to the first question, the second question that was presented to the user and the answer to the second question are associated with each other in the shared data store.

6. The method of claim 4, further comprising, after converting the answer to the second question into the answer to the first question, the computer, by the shared data store:
receiving a request from a modular rule engine for the answer to the first question; and
serving the answer to the first question in response to the modular rule engine in response to the request.

7. The method of claim 1, further comprising the computer by the shared data store receiving a request from the modular rule engine for the answer to the first question; and in response to the request, the computer, by the modification module, converting the answer to the second question into a corresponding answer to the first question, and the computer, by the shared data store, serving the answer to the first question to the modular rule engine in response to the request.

8. The method of claim 1, further comprising
the computer, by the modification module, converting the answer to the second question into the answer to the first question; and storing the answer to the first question to the shared data store,
the computer, by the modular rule engine, reading the answer to the first question from the shared data store, determining a second non-binding suggestion based at least in part upon the decision table and the answer to the first question and transmitting the second non-binding suggestion to the modular user interface controller,
the computer, by the modular user interface controller, determining whether or how to process the second non-binding suggestion comprising the third question.

9. The method of claim 1, wherein the first question is specified by a column of the decision table utilized by the rule engine, and the second question is not specified by the decision table.

10. The method of claim 1, wherein the first question is structured in a manner that is consistent with a data model or schema of the shared data store of the computerized ax return preparation application, and at least one of the second question and the answer to the second question is not structured in a manner that is consistent with the data model or schema.

11. The method of claim 10, the plurality of rules being expressed based at least in part upon the data model or schema of the shared data store of the computerized tax return preparation application.

12. The method of claim 1, the first question being in a form of a question concerning user data to be entered into the electronic tax return, and the second question being in a different form than the first question.

13. The method of claim 12, the different form of the second question comprising an assumption of user data.

14. The method of claim 1, wherein an answer to the first question is derived from the answer to the second question, and the answer to the first question is different from the answer to the second question.

15. The method of claim 1, the second question being different from the first question by being twisted relative to the first question such that a common answer to the first question and the second question convey different meanings.

16. The method of claim 1, the second question being different from the first question by rewording or rephrasing the first question such that the first question and the second question request the same or substantially similar information in different ways for determining electronic tax return information to be stored to the shored data store based on respective different answers to respective first and second questions.

17. The method of claim 15, the second question being twisted relative to the first question such that a first binary answer to the second question conveys the same or substantially similar meaning as a second binary answer to the first question, wherein the second binary answer is different from the first binary answer.

18. The method of claim 1, further comprising the computer receiving a request by the user to personalize the tax preparation application for the user, the modification module being triggered to determine the second question in response to the user's request.

19. The method of claim 1, wherein the modification module is triggered to determine the second question being automatically based at least in part upon the computer receiving or determining data of the pre-determined attribute.

20. The method of claim 1, the pre-determined attribute data comprising demographic data of the user.

21. The method of claim 20, the demographic data comprising an age of the user, wherein the modification module is triggered to determine the second question when the age of the user is less than a pre-determined age.

22. The method of claim 20, wherein the first question is presented to the user when the age of the user is at least the pre-determined age, and the modification module is triggered to determine the second question when the age of the user is less than the pre-determined age such that the second question but not the first question is presented to the user through the display.

23. The method of claim 1, the pre-determined attribute comprising a type of computing device utilized to prepare the electronic tax return.

24. The method of claim 23, wherein the modification module is triggered to determine the second question and present the second question but not the first question to the user in response to determining that the computing device executing the computerized tax return preparation application and utilized to prepare the electronic tax return is a mobile communication device.

25. The method of claim 1, the computer, by the modification module, determining the second question based on searching a table for the pre-determined attribute and identifying the second question in the table associated with data of the pre-determined attribute in the table.

26. The method of claim 1, further comprising the computer, by the modification module, determining a first probability of a positive response to the first question and a second probability of a positive response to the second question, wherein the modification module is triggered to select the second question for presentation to the user based at least in part upon the second probability being greater than the first probability.

27. The method of claim 1, the first question comprising a single question, and the second question comprising an aggregation of sub-questions, wherein the received answer to the second question applies to each of the sub-questions.

28. The method of claim 27, each of the first question and the sub-questions of the second question being based on a data model or schema of the shared data store of the computerized tax return preparation application.

29. The method of claim 28, further comprising the computer, by the conversion module of the shared data store:
   parsing the second question to determine respective sub-questions; and
   storing the received answer as the answer to each of the sub-questions in the shared data store.

30. The method of claim 27, the first question comprising a single question, and the second question comprising an aggregation of sub-questions including:
   a question that is based on a data model or schema of the shared data store of the computerized tax return preparation application, and
   a question that is not based on the data model or schema, further comprising the computer, by the conversion module of the shared data store:
      parsing the sub-questions of the second question,
      storing, in the shared data store, the received answer as the answer to a sub-question that is based on the data model or schema,
      converting or mapping the received answer into a different answer for a sub-question or answer that is not based on the data model or schema; and
      storing the different answer in the shared data store.

31. The method of claim 30, further comprising, the modular rule-based logic agent requesting the answer to the first question from the shared data store and
   answer to the first question that was not presented to the user and that was determined by converting or mapping the answer to the second question.

32. The method of claim 1, further comprising
   the computer, by the modular rule-based logic agent, reading the updated runtime data including the answer to the first question from the shared data store, selecting a third question to be included in a second non-binding suggestion, the second question being selected by the modular rule-based logic agent based on the decision table;
   the computer, by the modification module, receiving the second non-binding suggestion including the selected third question, determining data of a second pre-determined attribute of the user based at least in part upon the updated runtime data of the electronic tax return, and modifying the second non-binding suggestion by rephrasing the third question to form a fourth question different from the third question;
   the computer, by execution of the modular user interface controller, generating a second interview screen comprising the fourth question, presenting the second interview screen including the fourth question to the user through the display such that the fourth question but not the third question is presented to the user, receiving an answer to the fourth question through the interview screen, writing the answer to the fourth question to the shared data store, and flagging the answer to the fourth question in the shared data store; and
   the computer, by the conversion module of the shared data store, detecting the flagged answer to the fourth question, and determining an answer to the third question that was not presented to the user based at least in part upon the answer to the fourth question that was presented to the user, wherein the answer to the third question is stored to the shared data store to update the runtime data.

33. A non-transitory computer readable medium comprising instructions, which when executed by a processor of a computing device, causes the computing device to execute a process for presenting a personalized interview question to a user of a tax return preparation application during preparation of an electronic tax return perform a method comprising:
   executing a modular rule-based logic agent of the computerized tax return preparation application, wherein execution of the modular rule-based logic agent comprises reading runtime data of the electronic tax return from a shared data store and selecting a first question to be included in a non-binding suggestion, the first question being selected by the modular rule-based logic agent based on a data structure comprising a decision table including a plurality of rows defining respective rules and a plurality of columns defining respective questions and which rules remain after elimination of at least one rule based on the runtime data;
   executing a modification module of the computerized tax return preparation application that is in communication with the modular rule-based logic agent and a modular user interface controller, wherein execution of the modification module comprises receiving the non-binding suggestion including the selected first question, determining data of a pre-determined attribute of the user based at least in part upon the runtime data of the electronic tax return, and modifying the nonbinding suggestion by rephrasing the first question to a second question different from the first question based at least in part upon the pre-determined attribute data and the first question;
   executing a modular user interface controller in communication with the modification module, wherein execution of the modular user interface controller comprises generating an interview screen comprising the second question, presenting the interview screen to the user through a display of the computer such that the second question but not the first question is presented to the user, receiving an answer to the second question through the interview screen, and writing the answer to the second question to the shared data store, and flagging the answer to the second question in the shared data store; and
   executing a conversion module of the shared data store, wherein execution of the conversion module comprises detecting the flagged answer to the second question, and determining an answer to the first question that was not presented to the user based at least in part upon the answer to the second question that was presented to the user, wherein the answer to the first question is stored to the shared data store to update the runtime data.

* * * * *